US012724981B1

(12) United States Patent
Thanvantri Vasudevan et al.

(10) Patent No.: US 12,724,981 B1
(45) Date of Patent: Sep. 1, 2026

(54) FINE TUNING LARGE LANGUAGE MODELS

(71) Applicant: DocuSign, Inc., San Francisco, CA (US)

(72) Inventors: Vishal Thanvantri Vasudevan, Lynnwood, WA (US); Yan He, Bellevue, WA (US); Ankit Srivastava, Seattle, WA (US); Ramachandra Kota, Mountain View, CA (US); Alexey Zakhvatov, Redmond, WA (US)

(73) Assignee: Docusign, Inc., San Francisco, CA (US)

( * ) Notice: Subject to any disclaimer, the term of this patent is extended or adjusted under 35 U.S.C. 154(b) by 49 days.

(21) Appl. No.: 18/522,918

(22) Filed: Nov. 29, 2023

(51) Int. Cl.
*G06F 40/40* (2020.01)
*G06F 16/93* (2019.01)
*G06F 40/284* (2020.01)

(52) U.S. Cl.
CPC .............. *G06F 40/40* (2020.01); *G06F 16/93* (2019.01); *G06F 40/284* (2020.01)

(58) Field of Classification Search
CPC ......... G06F 40/40; G06F 40/284; G06F 16/93
See application file for complete search history.

(56) References Cited

U.S. PATENT DOCUMENTS 12,008,621 B1 * 6/2024 Atef ...................... G06F 16/953
12,050,599 B1 * 7/2024 Garcia-Sanchez .......................... G06F 16/24578
12,067,039 B1 * 8/2024 Campos ............... G06V 30/412
2024/0281621 A1 * 8/2024 Janakiraman ........... G06F 40/47
2024/0354130 A1 * 10/2024 Cadoni ................. G06F 40/279
2024/0354346 A1 * 10/2024 Lott ...................... G06F 40/284
2024/0419919 A1 * 12/2024 Xiang ..................... G06F 40/56
2025/0007926 A1 * 1/2025 Southgate ............. G06F 21/552
2025/0021739 A1 * 1/2025 Shin ...................... G06F 40/103
2025/0060944 A1 * 2/2025 Radhakrishna ......... G06F 40/35
2025/0077792 A1 * 3/2025 Chen ...................... G06N 3/045
2025/0094025 A1 * 3/2025 Maschmeyer ......... G06N 3/047
2025/0119396 A1 * 4/2025 Taheri ..................... H04L 51/02
2025/0131247 A1 * 4/2025 Mondlock .............. G06N 5/022
2025/0147999 A1 * 5/2025 Lee ....................... G06F 16/353
2025/0156642 A1 * 5/2025 Serry .................... G06F 40/284
2025/0156644 A1 * 5/2025 Neerukonda ........ G06N 3/0455

FOREIGN PATENT DOCUMENTS

CN 117033799 A * 11/2023 ......... G06F 16/9535

* cited by examiner

*Primary Examiner* — Anne L Thomas-Homescu
(74) *Attorney, Agent, or Firm* — KDW FIRM PLLC

(57) ABSTRACT

A method, a system, and a computer program product for tuning a large language model. One or more first electronic documents are sampled to generate one or more sampled electronic documents. One or more portions of one or more second electronic documents are identified and extracted from the second electronic documents. The sampled electronic documents are sent to a generative artificial intelligence (AI) model to generate one or more first labels. One or more portions of the second electronic documents are sent to the generative AI model to generate one or more second labels. A large language model is trained using one or more first labels and one or more second labels to generate a trained large language model.

20 Claims, 19 Drawing Sheets

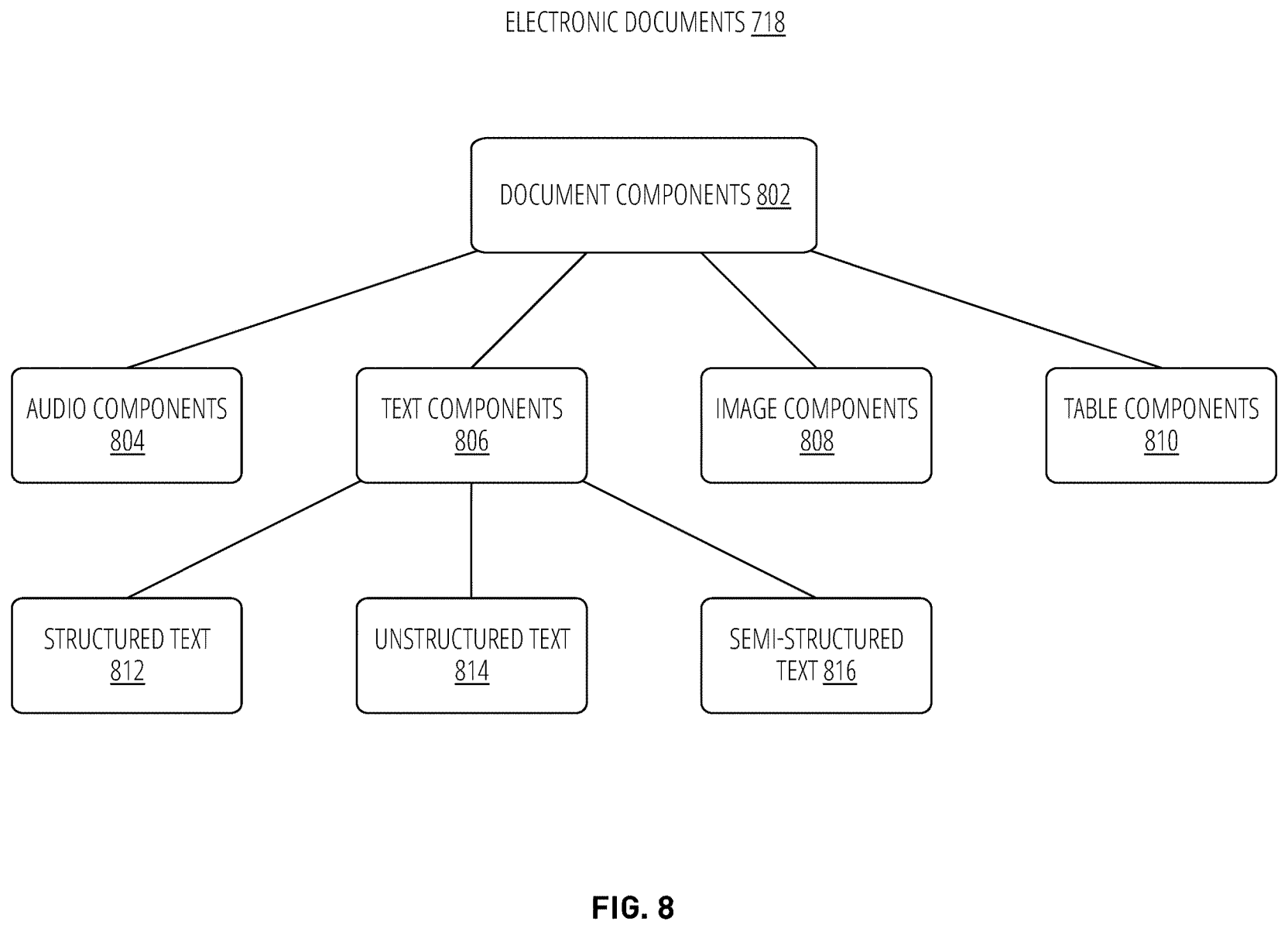

ELECTRONIC DOCUMENTS 718

DOCUMENT COMPONENTS 802

AUDIO COMPONENTS 804

TEXT COMPONENTS 806

IMAGE COMPONENTS 808

TABLE COMPONENTS 810

STRUCTURED TEXT 812

UNSTRUCTURED TEXT 814

SEMI-STRUCTURED TEXT 816

FIG. 8

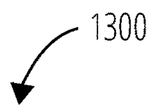

SAMPLE ONE OR MORE FIRST ELECTRONIC DOCUMENTS TO GENERATE ONE OR MORE SAMPLED ELECTRONIC DOCUMENTS 1302

IDENTIFY ONE OR MORE PORTIONS OF ONE OR MORE SECOND ELECTRONIC DOCUMENTS, AND EXTRACT ONE OR MORE PORTIONS FROM ONE OR MORE SECOND ELECTRONIC DOCUMENTS 1304

SEND ONE OR MORE SAMPLED ELECTRONIC DOCUMENTS TO A GENERATIVE ARTIFICIAL INTELLIGENCE (AI) MODEL TO GENERATE ONE OR MORE FIRST LABELS FOR ONE OR MORE SAMPLED ELECTRONIC DOCUMENTS, AND SEND ONE OR MORE PORTIONS OF ONE OR MORE SECOND ELECTRONIC DOCUMENTS TO THE GENERATIVE AI MODEL TO GENERATE ONE OR MORE SECOND LABELS 1306

TRAIN A LARGE LANGUAGE MODEL USING ONE OR MORE FIRST LABELS AND ONE OR MORE SECOND LABELS 1308

GENERATE A TRAINED LARGE LANGUAGE MODEL 1310

FIG. 13

IDENTIFY ONE OR MORE CONTEXT-BASED PORTIONS OF THE ONE OR MORE FIRST ELECTRONIC DOCUMENTS 1402

ASSIGN ONE OR MORE IDENTIFIERS TO THE ONE OR MORE CONTEXT-BASED PORTIONS 1404

GENERATE THE ONE OR MORE SAMPLED ELECTRONIC DOCUMENTS USING THE ONE OR MORE ASSIGNED IDENTIFIERS 1406

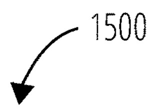

RETRIEVE ONE OR MORE FIRST ELECTRONIC DOCUMENTS FROM A PLURALITY OF ELECTRONIC DATA SOURCES 1502

GENERATE ONE OR MORE SAMPLED ELECTRONIC DOCUMENTS BASED ON ONE OR MORE FIRST ELECTRONIC DOCUMENTS 1504

EXTRACT ONE OR MORE PORTIONS FROM ONE OR MORE SECOND ELECTRONIC DOCUMENTS 1506

SEND ONE OR MORE SAMPLED ELECTRONIC DOCUMENTS TO A GENERATIVE ARTIFICIAL INTELLIGENCE (AI) MODEL TO GENERATE ONE OR MORE FIRST LABELS FOR ONE OR MORE SAMPLED ELECTRONIC DOCUMENTS, AND SEND ONE OR MORE PORTIONS OF ONE OR MORE SECOND ELECTRONIC DOCUMENTS TO THE GENERATIVE AI MODEL TO GENERATE ONE OR MORE SECOND LABELS 1508

TRAIN A LARGE LANGUAGE MODEL USING ONE OR MORE FIRST LABELS AND ONE OR MORE SECOND LABELS 1510

GENERATE A TRAINED LARGE LANGUAGE MODEL 1512

FIG. 15

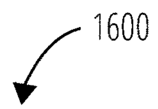

TRAIN A LARGE LANGUAGE MODEL USING ONE OR MORE LABELS, WHEREIN ONE OR MORE LABELS INCLUDE AT LEAST ONE OF: ONE OR MORE FIRST LABELS AND ONE OR MORE SECOND LABELS, ONE OR MORE FIRST LABELS ARE GENERATED BASED ON ONE OR MORE FIRST ELECTRONIC DOCUMENTS, AND ONE OR MORE SECOND LABELS ARE GENERATED BASED ON ONE OR MORE PORTIONS EXTRACTED FROM ONE OR MORE SECOND ELECTRONIC DOCUMENTS 1602

GENERATE A TRAINED LARGE LANGUAGE MODEL 1604

COMPUTER-READABLE STORAGE MEDIUM 1702

COMPUTER EXECUTABLE INSTRUCTIONS 1704

FIG. 17

FINE TUNING LARGE LANGUAGE MODELS

BACKGROUND

As the number of electronic documents grows, so is the need to process and analyze such documents for the purposes of extracting relevant data or information. Electronic documents can include, for example, legal agreements, publicly available documents, such as, documents filed with governmental agencies, and/or any other documents. To manage such growing collection of documents, many companies implement document management platforms. However, due to constantly evolving legal and technical requirements imposed on electronic documents, an entire ecosystem of processes, devices, systems and networks continuously evolve around the safe and secure contract lifecycle management (CLM), such as generation, delivery, management, searching and storage of electronic documents. Analysis of documents or portions thereof is a difficult and compute-intensive operation, especially when it concerns large documents that include a substantial amount of information that may or may not be located in the same place in the document. The analysis may involve use of various models, such as, for example, large language models that are able to ingest large amounts of data and output a result (e.g., a summary of a document, a summary of certain portions of a document, etc.). However, existing large language models, due to ineffective training, sometimes produce results that are inaccurate or worse, incorrect.

BRIEF DESCRIPTION OF THE DRAWINGS

To easily identify the discussion of any particular element or act, the most significant digit or digits in a reference number refer to the figure number in which that element is first introduced.

FIG. 8 illustrates electronic documents in accordance with one embodiment.

FIG. 13 illustrates an example process for generating a tuned large language model, according to some embodiments of the current subject matter.

FIG. 15 illustrates another example process for generating a tuned large language model, according to some embodiments of the current subject matter.

FIG. 16 illustrates yet another example process for generating a tuned large language model, according to some embodiments of the current subject matter.

FIG. 17 illustrates a computer-readable storage medium in accordance with one embodiment.

DETAILED DESCRIPTION

Figure 1:
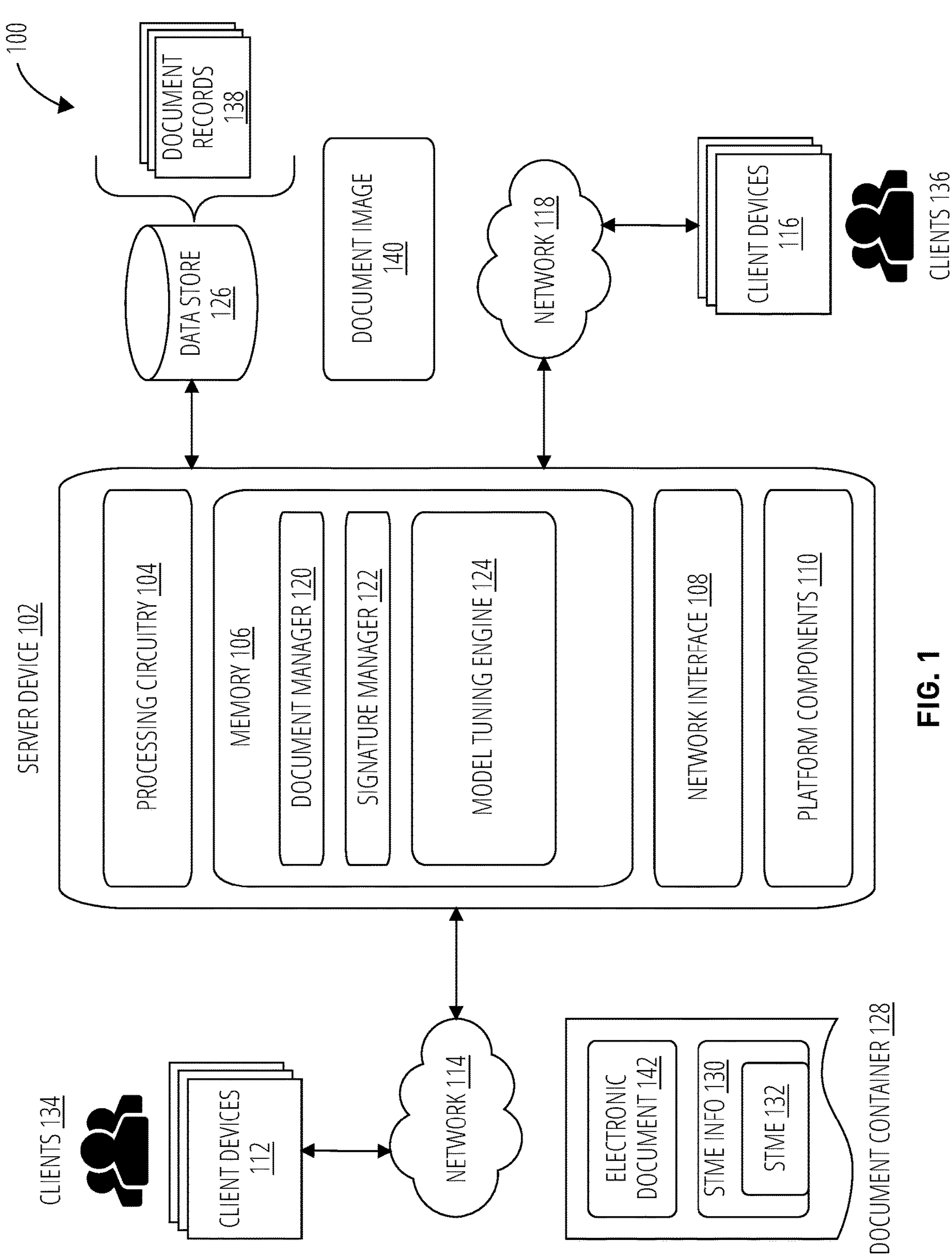
FIG. 1 illustrates a system in accordance with one embodiment.

In some example embodiments, the current subject matter relates to an ability to tune and/or train one or more models, such as, for example, a large language model, so that a trained model is capable of generating more accurate results in response to queries. Moreover, embodiments disclosed herein are generally directed to techniques for processing of documents, where such document processing is assisted through use of machine learning models and artificial intelligence architectures that may be trained using the processes disclosed herein.

In general, a document may include a multimedia record. The term "electronic" may refer to technology having electrical, digital, magnetic, wireless, optical, electromagnetic, or similar capabilities. The term "electronic document" may refer to any electronic multimedia content intended to be used in an electronic form. An electronic document may be part of an electronic record. The term "electronic record" may refer to a contract or other record created, generated, sent, communicated, received, or stored by an electronic mechanism. An electronic document may have an electronic signature. The term "electronic signature" may refer to an electronic sound, symbol, or process, attached to or logically associated with an electronic document, such as a contract or other record, and executed or adopted by a person with the intent to sign the record.

An online electronic document management system provides a host of different benefits to users (e.g., a client or customer) of the system. One advantage is added convenience in generating and signing an electronic document, such as a legally binding agreement. Parties to an agreement can review, revise and sign the agreement from anywhere around the world on a multitude of electronic devices, such as computers, tablets and smartphones.

In some embodiments, the current subject matter may be configured to provide an ability to tune one or more models, e.g., a large language model, using one or more electronic documents that may be obtained from one or more or a plurality of diverse sources (e.g., public databases, private database, etc.). Some data sources (e.g., public databases, such as, for example, SEC EDGAR, etc.) may store electronic documents, where such documents and/or portions thereof might not be labeled and/or identifiable by any specific means. Other data sources (e.g., private databases, etc.) may store documents that may include be organized in a particular way, labeled (e.g., portions of documents may be identified in a particular manner, etc.), and/or otherwise identifiable. Electronic documents may be represented in any desired format (e.g., .pdf, .docx, etc.). Moreover, the documents may include, for instance, text, graphics, images, tables, audio, video, computing code (e.g., source code, etc.) and/or any other type of media.

The tuning process may be initiated by generating and sending one or more queries to such data sources to retrieve one or more documents. Alternatively, or in addition, the model tuning process may be initiated by receiving documents from data sources without first generating a query.

Once electronic documents from public data sources are received, they may be sampled to produce a sampled set of electronic documents. The sampled set of documents may be a smaller set of electronic documents than the set of documents originally received from public data sources. In some embodiments, sampling may be context-based. For example, one or more context-based portions of one or more electronic documents received from public databases may be identified (e.g., clauses of contractual agreements relating to termination, etc.). One or more identifiers may be assigned to the identified context-based portions. Using the identifiers, the sampled set of documents may be generated.

Once the sampled set of electronic documents is determined, the current subject matter system may be configured to send such sampled electronic documents to a generative artificial intelligence (AI) model to generate one or more first labels for the sampled electronic documents. The generative AI models may be part of the current subject matter system and/or be one or more third party models (e.g., ChatGPT, Bard, DALL-E, Midjourney, DeepMind, etc.). The generative AI model(s) may be configured to generate labels that may be assigned to electronic documents, as a whole, and/or to portions of such documents (e.g., "a termination provision," "a sales term provision," etc.).

In some embodiments, the current subject matter may be configured to generate another set of labels for electronic documents that may be retrieved from one or more other data sources that may store electronic documents in a particular way (e.g., as stated above, private databases). The electronic documents may be retrieved from such data sources in a response to a query and/or in any other desired way. Once retrieved, one or more portions may be extracted from the electronic documents for the purposes of generating one or more second labels.

In some embodiments, document portions may be selected and/or identified using one or more machine learning (ML) models. The ML models may be trained using one or more features associated with electronic documents, portions of documents, etc. For example, the features may include at least one of: type(s) of electronic document(s), various content elements of electronic document(s), position of elements in document(s), types of element(s), function(s) of element(s), and/or any other features and/or any combination thereof. The models may be trained using historical data associated with use of document(s), task(s) associated with documents, and/or any other information. Moreover, the training may involve re-training and/or refresh-training based on use of models/user feedback, etc. In some embodiments, the models may rely on labeled (e.g., labeling elements within a document as important), and/or unlabeled datasets.

To generate labels for the portions of documents, the extracted document portions may be sent to the generative AI model. The generative AI model may be provided with the extracted document portions and/or the electronic documents themselves, etc. and may use the provided information to generate one or more labels for portions of documents. For example, the generative AI model may be provided with portions from sales agreements, such as, portions of agreements related to termination, and may be asked to generate labels, which may indicate that portions in agreements mentioning "termination" or "term" may be labeled with a termination label.

In some embodiments, the extracted portions of electronic documents may be identified using one or more tokens and/or any other text and/or identifiers. The tokens/text/identifiers/etc. may be determined based on the content of such portions. The generative AI model may be provided with the token/text/identifiers/etc. for the purposes of creating labels for the document portions.

As can be understood, same and/or different generative AI models may be used for generation of the above sets of labels. The generated sets of labels may then be used to execute training and/or tuning of a large language model, so that a trained large language model may be generated. Training of the large language model may be executed using a low-rank adaptation process, and/or any other type of training processes. Moreover, the training may involve re-training and/or refresh-training based on updated labels, use of models, user feedback, etc. The trained large language model may then be used to process electronic documents (e.g., sales agreements, lease agreement, legal documents (e.g., licenses, document production, etc.), and/or any other types of documents).

One of the technical benefits of the current subject matter is that it provides for a dynamic generation of trained large language models that can effectively and efficiently process large electronic documents that may be retrieved from data sources that are not well-organized or at all. Use of different sets of labels allows for generation of a more refined training dataset ensuring that training of large language models using it will be more precise, thereby enabling more accurate outcomes when such trained large language models are used to process large electronic documents. The current subject matter's training large language models substantially reduces use of compute resources that may typically be consumed by generative AI models in performing of complete document analysis. Some conventional systems typically analyze an entire document to generate labels. This consumes a substantial amount of computing resources and takes a long time to complete, especially for large documents. Further, oftentimes, such systems generate incorrect labels with glaring omissions and errors leading to undesired consequences.

An additional technical benefit to the current subject matter is its ability to generate training datasets, not only expeditiously, but more accurately. As the generative AI models are presented with selected information that may be related to specific document portions, there are substantially fewer errors that may occur during generation of label sets. This is because the amount of information that such generative AI models need to process is significantly smaller, thereby decreasing changes of an incorrect output. Existing systems lack an ability to identify such specific document sections for the purposes of generating labels. Instead, full documents are analyzed and summarized, which enhances possibilities of errors and mistakes.

The present disclosure will now be described with reference to the attached drawing figures, wherein like reference numerals are used to refer to like elements throughout, and wherein the illustrated structures and devices are not necessarily drawn to scale. As utilized herein, terms "component," "system," "interface," and the like are intended to refer to a computer-related entity, hardware, software (e.g., in execution), and/or firmware. For example, a component can be a processor (e.g., a microprocessor, a controller, or other processing device), a process running on a processor, a controller, an object, an executable, a program, a storage device, a computer, a tablet PC and/or a user equipment (e.g., mobile phone, etc.) with a processing device. By way of illustration, an application running on a server and the server can also be a component. One or more components can reside within a process, and a component can be localized on one computer and/or distributed between two or more computers. A set of elements or a set of other components can be described herein, in which the term "set" can be interpreted as "one or more."

Further, these components can execute from various computer readable storage media having various data structures stored thereon such as with a module, for example. The components can communicate via local and/or remote processes such as in accordance with a signal having one or more data packets (e.g., data from one component interacting with another component in a local system, distributed system, and/or across a network, such as, the Internet, a local area network, a wide area network, or similar network with other systems via the signal).

As another example, a component can be an apparatus with specific functionality provided by mechanical parts operated by electric or electronic circuitry, in which the electric or electronic circuitry can be operated by a software application, or a firmware application executed by one or more processors. The one or more processors can be internal or external to the apparatus and can execute at least a part of the software or firmware application. As yet another example, a component can be an apparatus that provides specific functionality through electronic components without mechanical parts; the electronic components can include one or more processors therein to execute software and/or firmware that confer(s), at least in part, the functionality of the electronic components.

Use of the word exemplary is intended to present concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form. Furthermore, to the extent that the terms "including", "includes", "having", "has", "with", or variants thereof are used in either the detailed description and the claims, such terms are intended to be inclusive in a manner similar to the term "comprising." Additionally, in situations wherein one or more numbered items are discussed (e.g., a "first X", a "second X", etc.), in general the one or more numbered items may be distinct, or they may be the same, although in some situations the context may indicate that they are distinct or that they are the same.

As used herein, the term "circuitry" may refer to, be part of, or include a circuit, an integrated circuit (IC), a monolithic IC, a discrete circuit, a hybrid integrated circuit (HIC), an Application Specific Integrated Circuit (ASIC), an electronic circuit, a logic circuit, a microcircuit, a hybrid circuit, a microchip, a chip, a chiplet, a chipset, a multi-chip module (MCM), a semiconductor die, a system on a chip (SoC), a processor (shared, dedicated, or group), a processor circuit, a processing circuit, or associated memory (shared, dedicated, or group) operably coupled to the circuitry that execute one or more software or firmware programs, a combinational logic circuit, or other suitable hardware components that provide the described functionality. In some embodiments, the circuitry may be implemented in, or functions associated with the circuitry may be implemented by, one or more software or firmware modules. In some embodiments, circuitry may include logic, at least partially operable in hardware.

FIG. 1 illustrates an embodiment of a system 100. The system 100 may be suitable for implementing one or more embodiments as described herein. In one embodiment, for example, the system 100 may comprise an electronic document management platform (EDMP) suitable for managing a collection of electronic documents. An example of an EDMP includes a product or technology offered by DocuSign®, Inc., located in San Francisco, California ("DocuSign"). DocuSign is a company that provides electronic signature technology and digital transaction management services for facilitating electronic exchanges of contracts and signed documents. An example of a DocuSign product is a DocuSign Agreement Cloud that is a framework for generating, managing, signing and storing electronic documents on different devices. It may be appreciated that the system 100 may be implemented using other EDMP, technologies and products as well. For example, the system 100 may be implemented as an online signature system, online document creation and management system, an online workflow management system, a multi-party communication and interaction platform, a social networking system, a marketplace and financial transaction management system, a customer record management system, and other digital transaction management platforms. Embodiments are not limited in this context.

The system 100 may implement an EDMP as a cloud computing system. Cloud computing is a model for providing on-demand access to a shared pool of computing resources, such as servers, storage, applications, and services, over the Internet. Instead of maintaining their own physical servers and infrastructure, companies can rent or lease computing resources from a cloud service provider. In a cloud computing system, the computing resources are hosted in data centers, which are typically distributed across multiple geographic locations. These data centers are designed to provide high availability, scalability, and reliability, and are connected by a network infrastructure that allows users to access the resources they need. Some examples of cloud computing services include Infrastructure-as-a-Service (IaaS), Platform-as-a-Service (PaaS), and Software-as-a-Service (SaaS).

The system 100 may implement various search tools and algorithms designed to search for electronic document(s) and/or collections of electronic documents and/or information within an electronic document or across a collection of electronic documents. Within the context of a cloud computing system, the system 100 may implement a cloud search service accessible to users via a web interface or web portal front-end server system. A cloud search service is a managed service that allows developers and businesses to add search capabilities to their applications or websites without the need to build and maintain their own search infrastructure. Cloud search services typically provide powerful search capabilities, such as faceted search, full-text search, and auto-complete suggestions, while also offering features like scalability, availability, and reliability. A cloud search service typically operates in a distributed manner, with indexing and search nodes located across multiple data centers for high availability and faster query responses. These services typically offer application program interfaces (APIs) that allow developers to easily integrate search functionality into their applications or websites. One major advantage of cloud search services is that they are designed to handle large-scale data sets and provide powerful search capabilities that can be difficult to achieve with traditional search engines. Cloud search services can also provide advanced features, such as machine learning-powered search, natural language processing, and personalized recommendations, which can help improve the user experience and make search more efficient. Some examples of popular cloud search services include Amazon CloudSearch, Elasticsearch, and Azure Search. These services are typically offered on a pay-as-you-go basis, allowing businesses to pay only for the resources they use, making them an affordable option for businesses of all sizes.

In general, the system 100 may allow users to generate, revise and electronically sign electronic documents. When implemented as a large-scale cloud computing service, the system 100 may allow entities and organizations to amass a significant number of electronic documents, including both signed electronic documents and unsigned electronic documents. As such, the system 100 may need to manage a large collection of electronic documents for different entities, a task that is sometimes referred to as contract lifecycle management (CLM).

As shown in FIG. 1, the system 100 may include a server device 102 communicatively coupled to a set of client devices 112 via a network 114. The server device 102 may also be communicatively coupled to a set of client devices 116 via a network 118. The client devices 112 may be associated with a set of clients 134. The client devices 116 may be associated with a set of clients 136. In one network topology, the server device 102 may represent any server device, such as a server blade in a server rack as part of a cloud computing architecture, while the client devices 112 and the client devices 116 may represent any client device, such as a smart wearable (e.g., a smart watch), a smart phone, a tablet computer, a laptop computer, a desktop computer, a mobile device, and so forth. The server device 102 may be coupled to a local or remote data store 126 to store document records 138. It may be appreciated that the system 100 may have more or less devices than shown in FIG. 1 with a different network topology as needed for a given implementation. Embodiments are not limited in this context.

Figure 18:
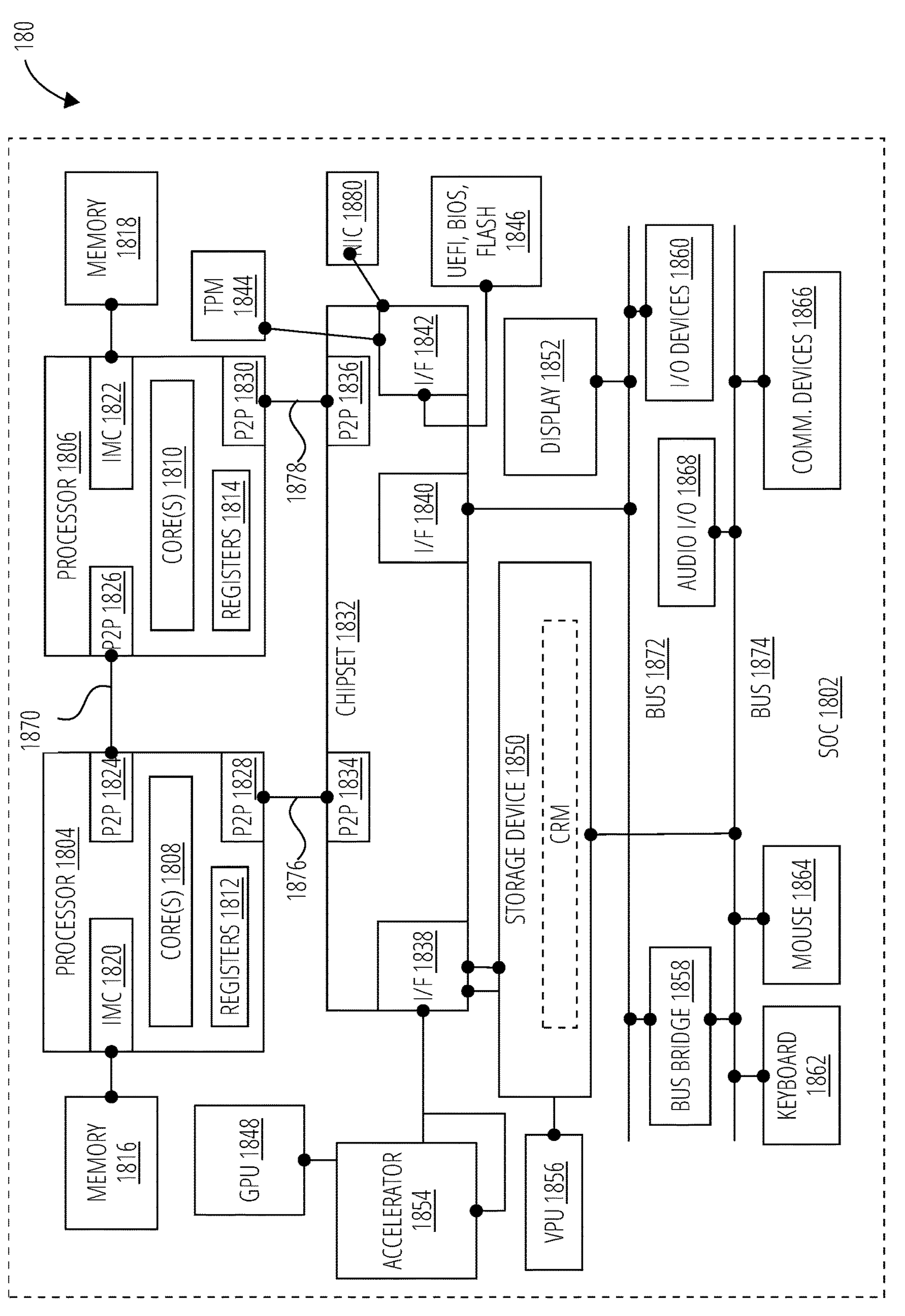
FIG. 18 illustrates a computing architecture in accordance with one embodiment.

In various embodiments, the server device 102 may include various hardware elements, such as a processing circuitry 104, a memory 106, a network interface 108, and a set of platform components 110. The client devices 112 and/or the client devices 116 may include similar hardware elements as those depicted for the server device 102. The server device 102, client devices 112, and client devices 116, and associated hardware elements, are described in more detail with reference to a computing architecture 1800 as depicted in FIG. 18.

Figure 19:
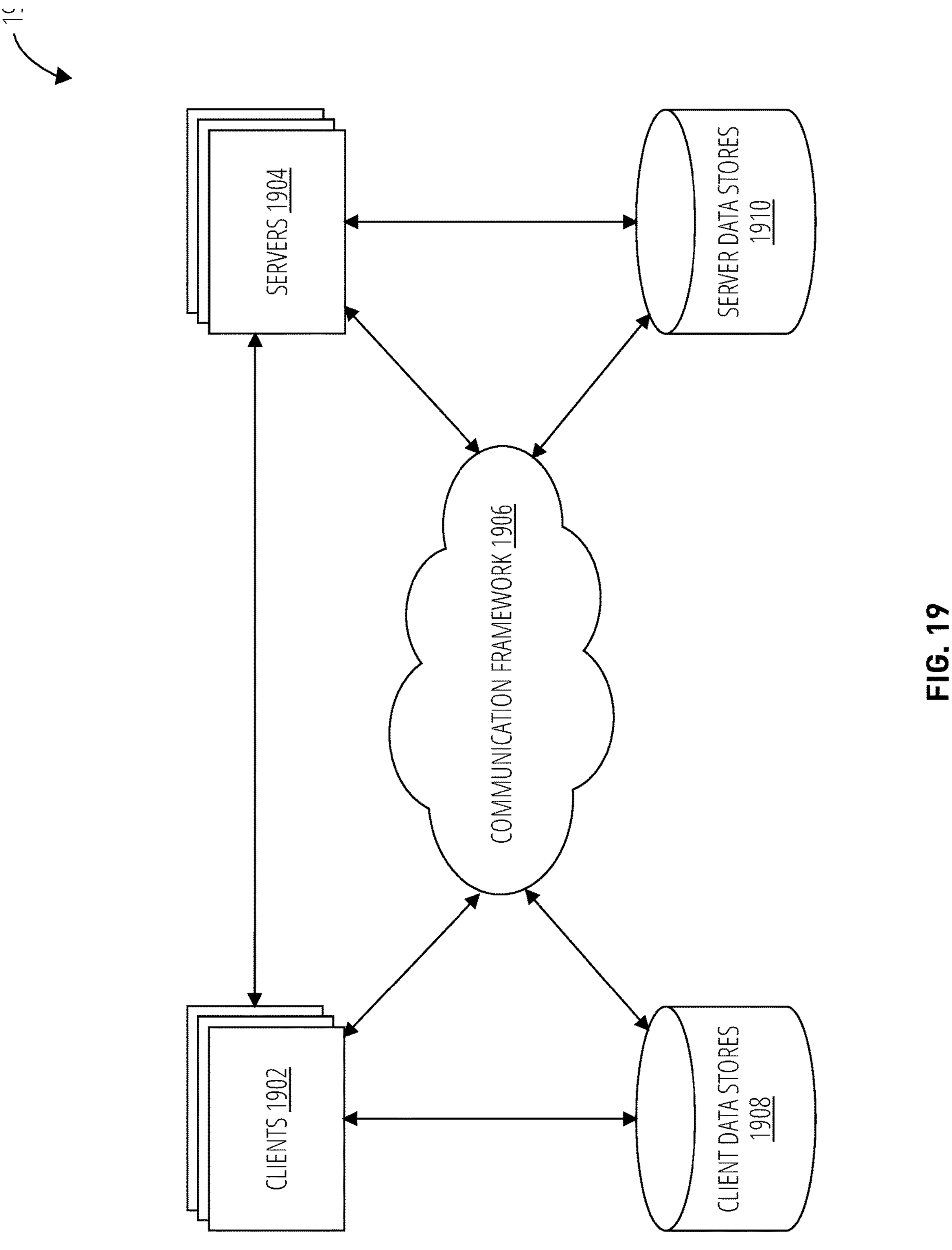
FIG. 19 illustrates a communications architecture in accordance with one embodiment.

In various embodiments, the server devices 102, 112 and/or 116 may communicate various types of electronic information, including control, data and/or content information, via one or both network 114, network 118. The network 114 and the network 118, and associated hardware elements, are described in more detail with reference to a communications architecture 1900 as depicted in FIG. 19.

The memory 106 may store a set of software components, such as computer executable instructions, that when executed by the processing circuitry 104, causes the processing circuitry 104 to implement various operations for an electronic document management platform. As depicted in FIG. 1, for example, the memory 106 may include a document manager 120, a signature manager 122, and a model tuning engine 124, among other software elements.

The document manager 120 may generally manage a collection of electronic documents stored as document records 138 in the data store 126. The document manager 120 may receive as input a document container 128 for an electronic document. A document container 128 is a file format that allows multiple data types to be embedded into a single file, sometimes referred to as a "wrapper" or "metafile." The document container 128 can include, among other types of information, an electronic document 142 and metadata for the electronic document 142.

A document container 128 may include an electronic document 142. The electronic document 142 may comprise any electronic multimedia content intended to be used in an electronic form. The electronic document 142 may comprise an electronic file having any given file format. Examples of file formats may include, without limitation, Adobe portable document format (PDF), Microsoft Word, PowerPoint, Excel, text files (.txt, .rtf), and so forth. In one embodiment, for example, the electronic document 142 may comprise a PDF created from a Microsoft Word file with one or more workflows developed by Adobe Systems Incorporated, an American multi-national computer software company headquartered in San Jose, California. Embodiments are not limited to this example.

In addition to the electronic document 142, the document container 128 may also include metadata for the electronic document 142. In one embodiment, the metadata may comprise signature tag marker element (STME) information 132 for the electronic document 142. The STME information 130 may include one or more STME 132, which are graphical user interface (GUI) elements superimposed on the electronic document 142. The GUI elements may include textual elements, visual elements, auditory elements, tactile elements, and so forth. In some embodiments, for example, the STME information 130 and STME 132 may be implemented as text tags, such as DocuSign anchor text, Adobe® Acrobat Sign® text tags, and so forth. Text tags are specially formatted text that can be placed anywhere within the content of an electronic document specifying the location, size, type of fields such as signature and initial fields, checkboxes, radio buttons, and form fields, and advanced optional field processing rules. Text tags can also be used when creating PDFs with form fields. Text tags may be converted into signature form fields when the document is sent for signature or uploaded. Text tags can be placed in any document type such as PDF, Microsoft Word, PowerPoint, Excel, and text files (.txt, .rtf). Text tags offer a flexible mechanism for setting up document templates that allow positioning signature and initial fields, collecting data from multiple parties within an agreement, defining validation rules for the collected data, and adding qualifying conditions. Once a document is correctly set up with text tags it can be used as a template when sending documents for signatures ensuring that the data collected for agreements is consistent and valid throughout the organization.

In one embodiment, the STME 132 may be utilized for receiving signing information, such as GUI placeholders for approval, checkbox, date signed, signature, social security number, organizational title, and other custom tags in association with the GUI elements contained in the electronic document 142. A client 134 may have used the client device 112 and/or the server device 102 to position one or more signature tag markers over the electronic document 142 with tools applications, and workflows developed by DocuSign or Adobe. For instance, assume the electronic document 142 is a commercial lease associated with STME 132 designed for receiving signing information to memorialize an agreement between a landlord and tenant to lease a parcel of commercial property. In this example, the signing information may include a signature, title, date signed, and other GUI elements.

The document manager 120 may process a document container 128 to generate a document image 140. The document image 140 is a unified or standard file format for an electronic document used by a given EDMP implemented by the system 100. For instance, the system 100 may standardize use of a document image 140 having an Adobe portable document format (PDF), which is typically denoted by a ".pdf" file extension. If the electronic document 142 in the document container 128 is in a non-PDF format, such as a Microsoft Word ".doc" or ".docx" file format, the document manager 120 may convert or transform the file format for the electronic document into the PDF file format. Further, if the document container 128 includes an electronic document 142 stored in an electronic file having a PDF format suitable for rendering on a screen size typically associated with a larger form factor device, such as a monitor for a desktop computer, the document manager 120 may transform the electronic document 142 into a PDF format suitable for rendering on a screen size associated with a smaller form factor device, such as a touch screen for a smart phone. The document manager 120 may transform the electronic document 142 to ensure that it adheres to regulatory requirements for electronic signatures, such as a "what you see is what you sign" (WYSIWYS) property, for example.

The signature manager 122 may generally manage signing operations for an electronic document, such as the document image 140. The signature manager 122 may manage an electronic signature process to send the document image 140 to signers, obtaining electronic signatures, verifying electronic signatures, and recording and storing the electronically signed document image 140. For instance, the signature manager 122 may communicate a document image 140 over the network 118 to one or more client devices 116 for rendering the document image 140. A client 136 may electronically sign the document image 140 and send the signed document image 140 to the server device 102 for verification, recordation, and storage.

Figure 5:
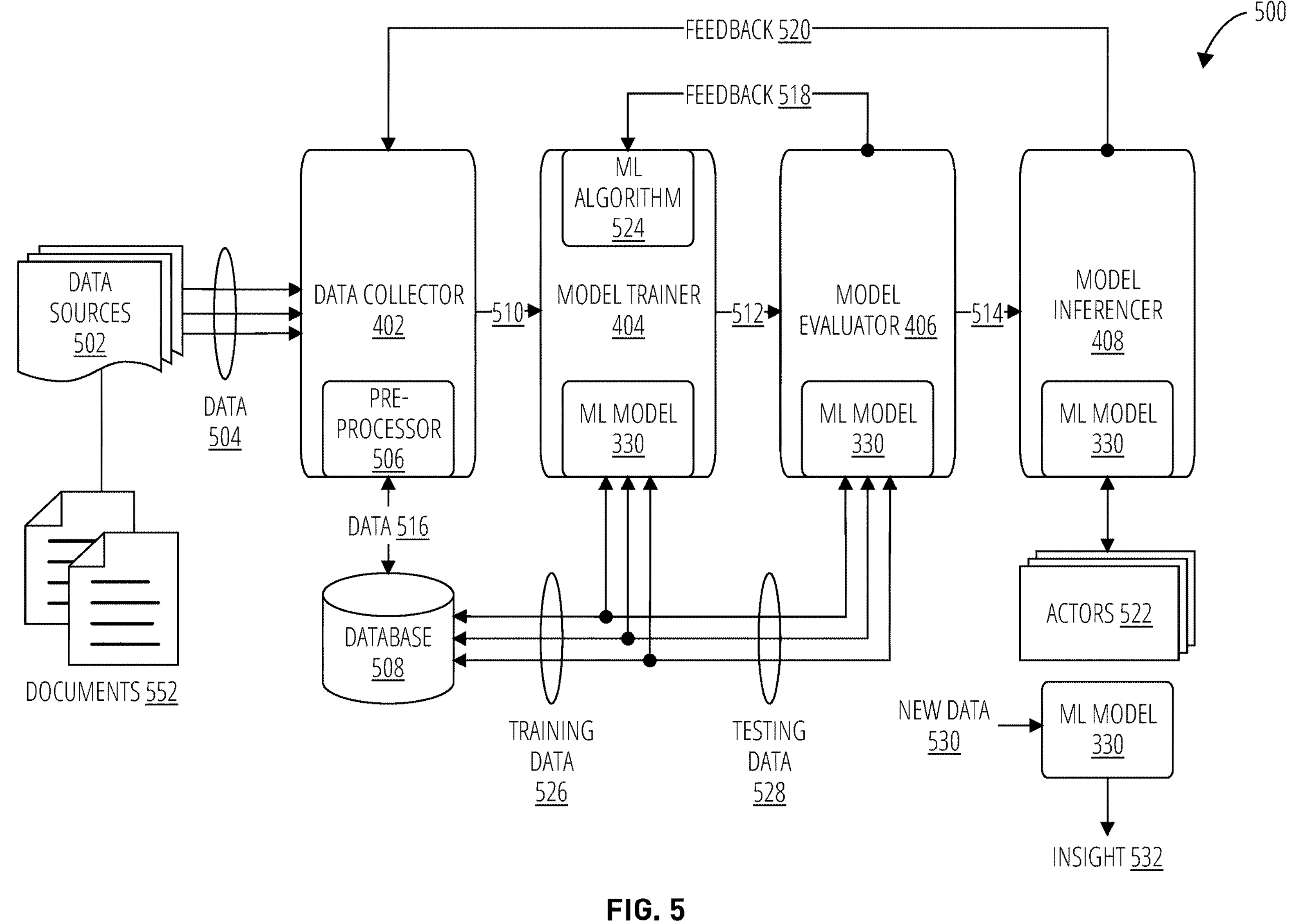
FIG. 5 illustrates an artificial intelligence architecture that may be used by the training device to generate the ML model for deployment by the inferencing device.

The model tuning engine 124 may implement and/or manage various artificial intelligence (AI) and machine learning (ML) agents to assist in various operational tasks for the EDMP of the system 100. The AI/ML agents and their operation associated with the model tuning engine 124, and associated software elements, are described in more detail with reference to an artificial intelligence architecture 500 as depicted in FIG. 5. The model tuning engine 124, and associated hardware elements, are described in more detail with reference to a computing architecture 1800 as depicted in FIG. 18.

In general operation, assume the server device 102 receives a document container 128 from a client device 112 over the network 114. The server device 102 processes the document container 128 and makes any necessary modifications or transforms as previously described to generate the document image 140. The document image 140 may have a file format of an Adobe PDF denoted by a ".pdf" file extension. The server device 102 sends the document image 140 to a client device 116 over the network 118. The client device 116 renders the document image 140 with the STME 132 in preparation for electronic signing operations to sign the document image 140.

Figure 7:
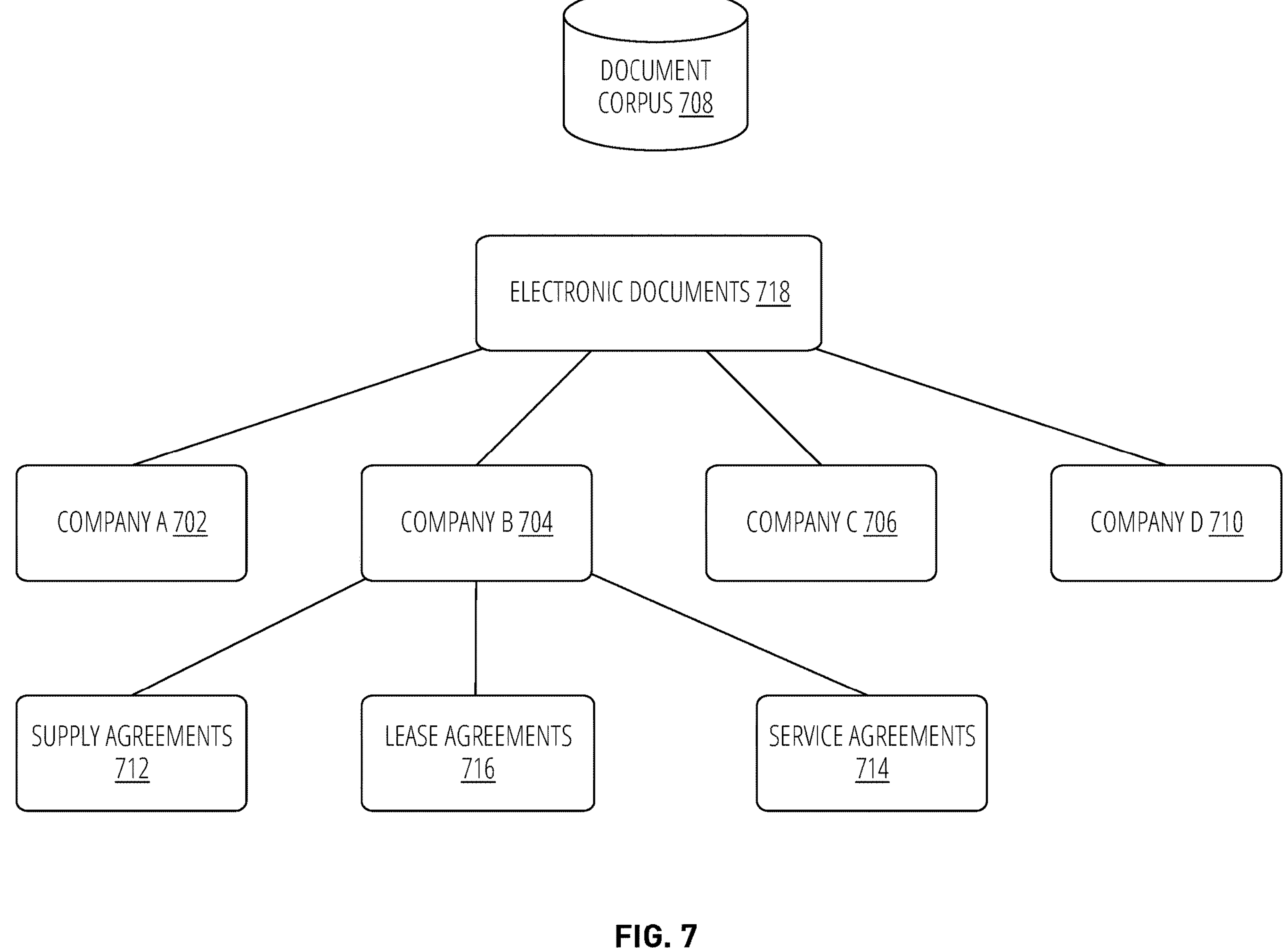
FIG. 7 illustrates a document corpus in accordance with one embodiment.

The document image 140 may further be associated with STME information 130 including one or more STME 132 that were positioned over the document image 140 by the client device 112 and/or the server device 102. The STME 132 may be utilized for receiving signing information (e.g., approval, checkbox, date signed, signature, social security number, organizational title, etc.) in association with the GUI elements contained in the document image 140. For instance, a client 134 may use the client device 112 and/or the server device 102 to position the STME 132 over the electronic documents 718, as shown in FIG. 7, with tools, applications, and workflows developed by DocuSign. For example, the electronic documents 718 may be a commercial lease that is associated with one or more or more STME 132 for receiving signing information to memorialize an agreement between a landlord and tenant to lease a parcel of commercial property. For example, the signing information may include a signature, title, date signed, and other GUI elements.

Broadly, a technological process for signing electronic documents may operate as follows. A client 134 may use a client device 112 to upload the document container 128, over the network 114, to the server device 102. The document manager 120, at the server device 102, receives and processes the document container 128. The document manager 120 may confirm or transform the electronic document 142 as a document image 140 that is rendered at a client device 116 to display the original PDF image including multiple and varied visual elements. The document manager 120 may generate the visual elements based on separate and distinct input including the STME information 130 and the STME 132 contained in the document container 128. In one embodiment, the PDF input in the form of the electronic document 142 may be received from and generated by one or more workflows developed by Adobe Systems Incorporated. The STME 132 input may be received from and generated by workflows developed by DocuSign. Accordingly, the PDF and the STME 132 are separate and distinct input as they are generated by different workflows provided by different providers.

The document manager 120 may generate the document image 140 for rendering visual elements in the form of text images, table images, STME images and other types of visual elements. The original PDF image information may be generated from the document container 128 including original documents elements included in the electronic document 142 of the document container 128 and the STME information 130 including the STME 132. Other visual elements for rendering images may include an illustration image, a graphic image, a header image, a footer image, a photograph image, and so forth.

The signature manager 122 may communicate the document image 140 over the network 118 to one or more client devices 116 for rendering the document image 140. The client devices 116 may be associated with clients 136, some of which may be signatories or signers targeted for electronically signing the document image 140 from the client 134 of the client device 112. The client device 112 may have utilized various work flows to identify the signers and associated network addresses (e.g., email address, short message service, multimedia message service, chat message, social message, etc.). For example, the client 134 may utilize workflows to identify multiple parties to the lease including bankers, landlord, and tenant. Further, the client 134 may utilize workflows to identify network addresses (e.g., email address) for each of the signers. The signature manager 122 may further be configured by the client 134 whether to communicate the document image 140 in series or parallel. For example, the signature manager 122 may utilize a workflow to configure communication of the document image 140 in series to obtain the signature of the first party before communicating the document image 140, including the signature of the first party, to a second party to obtain the signature of the second party before communicating the document image 140, including the signature of the first and second party to a third party, and so forth. Further for example, the client 134 may utilize workflows to configure communication of the document image 140 in parallel to multiple parties including the first party, second party, third party, and so forth, to obtain the signatures of each of the parties irrespective of any temporal order of their signatures.

The signature manager 122 may communicate the document image 140 to the one or more parties associated with the client devices 116 in a page format. Communicating in page format, by the signature manager 122, ensures that entire pages of the document image 140 are rendered on the client devices 116 throughout the signing process. The page format is utilized by the signature manager 122 to address potential legal requirements for binding a signer. The signature manager 122 utilizes the page format because a signer is only bound to a legal document that the signer is intended to be bound. To satisfy the legal requirement of intent, the signature manager 122 generates PDF image information for rendering the document image 140 to the one or more parties with a "what you see is what you sign" (WYSIWYS) property. The WYSIWYS property ensures the semantic interpretation of a digitally signed message is not changed, either by accident or by intent. If the WYSIWYS property is ignored, a digital signature may not be enforceable at law. The WYSIWYS property recognizes that, unlike a paper document, a digital document is not bound by its medium of presentation (e.g., layout, font, font size, etc.) and a medium of presentation may change the semantic interpretation of its content. Accordingly, the signature manager 122 anticipates a possible requirement to show intent in a legal proceeding by generating original PDF image information for rendering the document image 140 in page format. The signature manager 122 presents the document image 140 on a screen of a display device in the same way the signature manager 122 prints the document image 140 on the paper of a printing device.

As previously described, the document manager 120 may process a document container 128 to generate a document image 140 in a standard file format used by the system 100, such as an Adobe PDF, for example. Additionally, or alternatively, the document manager 120 may also implement processes and workflows to prepare an electronic document 142 stored in the document container 128. For instance, assume a client 134 uses the client device 112 to prepare an electronic document 142 suitable for receiving an electronic signature, such as the lease agreement in the previous example. The client 134 may use the client device 112 to locally or remotely access document management tools, features, processes and workflows provided by the document manager 120 of the server device 102. The client 134 may prepare the electronic document 142 as a brand new originally written document, a modification of a previous electronic document, or from a document template with predefined information content. Once prepared, the signature manager 122 may implement electronic signature (e-sign) tools, features, processes and workflows provided by the signature manager 122 of the server device 102 to facilitate electronic signing of the electronic document 142.

In addition, as discussed above, the system 100 may include a model tuning engine 124. The model tuning engine 124 may implement a set of tools and/or algorithms to generate one or more labels for electronic documents and/or any parts thereof. The model tuning engine 124 may be configured to retrieve one or more first electronic documents from a plurality of electronic data sources. For example, as stated above, the data sources may include various databases, e.g., government databases, public databases, etc., where electronic documents may be stored without specific identifiers and/or other ways of particularly determining how each portion of an electronic document may be identified (e.g., whether a particular clause in a sales agreement relates to termination, governing law, etc.). Document retrieval may be accomplished in response to a query and/or in any desired way. The model tuning engine 124 may then be configured to generate one or more sampled electronic documents based on the first electronic documents that have been retrieved. The set of sampled electronic documents may be smaller than the set of documents that may be received from one or more data sources.

The model tuning engine 124 may also be configured to receive and/or retrieve one or more second electronic documents from data sources that may be different from the data sources from which the first electronic documents are retrieved. The second electronic documents may be stored in various private databases and may be tokenized, where one or more tokens and/or identifiers and/or any other inputs may be assigned to one or more second electronic documents and/or portions thereof. The model tuning engine 124, using the tokens, may be configured to extract one or more portions from the retrieved second electronic documents. Use of tokens may allow the model tuning engine 124 to more easily identify and extract portions of electronic documents from large (e.g., multi-page) electronic documents. In some embodiments, the tokens may be generated and/or assigned automatically (e.g., using a machine learning model, a generative AI model, and/or any other model) and/or manually.

The model tuning engine 124 may then generate one or more first labels and one or more second labels by sending the sampled documents and the extracted portions to one or more generative AI models. The same and/or different generative AI model may be used to process the sampled documents and/or the extracted portions for the purposes of generating first set of labels based on the sampled documents and a second set of labels based on the extracted portions.

Once the first and second sets of labels are generated, the model tuning engine 124 may be configured to train a large language model using the generated first and second labels to generate a trained large language model. The training may be executed by the model tuning engine 124 using a low-rank adaptation of large language models algorithm and/or any other algorithm. In some non-limiting, example embodiments, the model tuning engine 124 may be configured to train a large language model that may be used to analyze legal language in various electronic documents, such as, for instance, sales contracts, leasing agreements, government contracts, non-disclosure agreements, and/or any other types of legal documents. Once trained by the model tuning engine 124 using first and second labels, the large language model may be more effectively tuned for the purposes of analyzing and identifying portions of electronic documents that may be responsive to a particular query (e.g., a query of "find termination provision in the lease agreement" would result in a response: "lease agreement clause 7 states 'the term of this agreement is 1 year, which may be automatically renewable for another year, unless cancelled by any party with prior notice.'").

Figure 2:
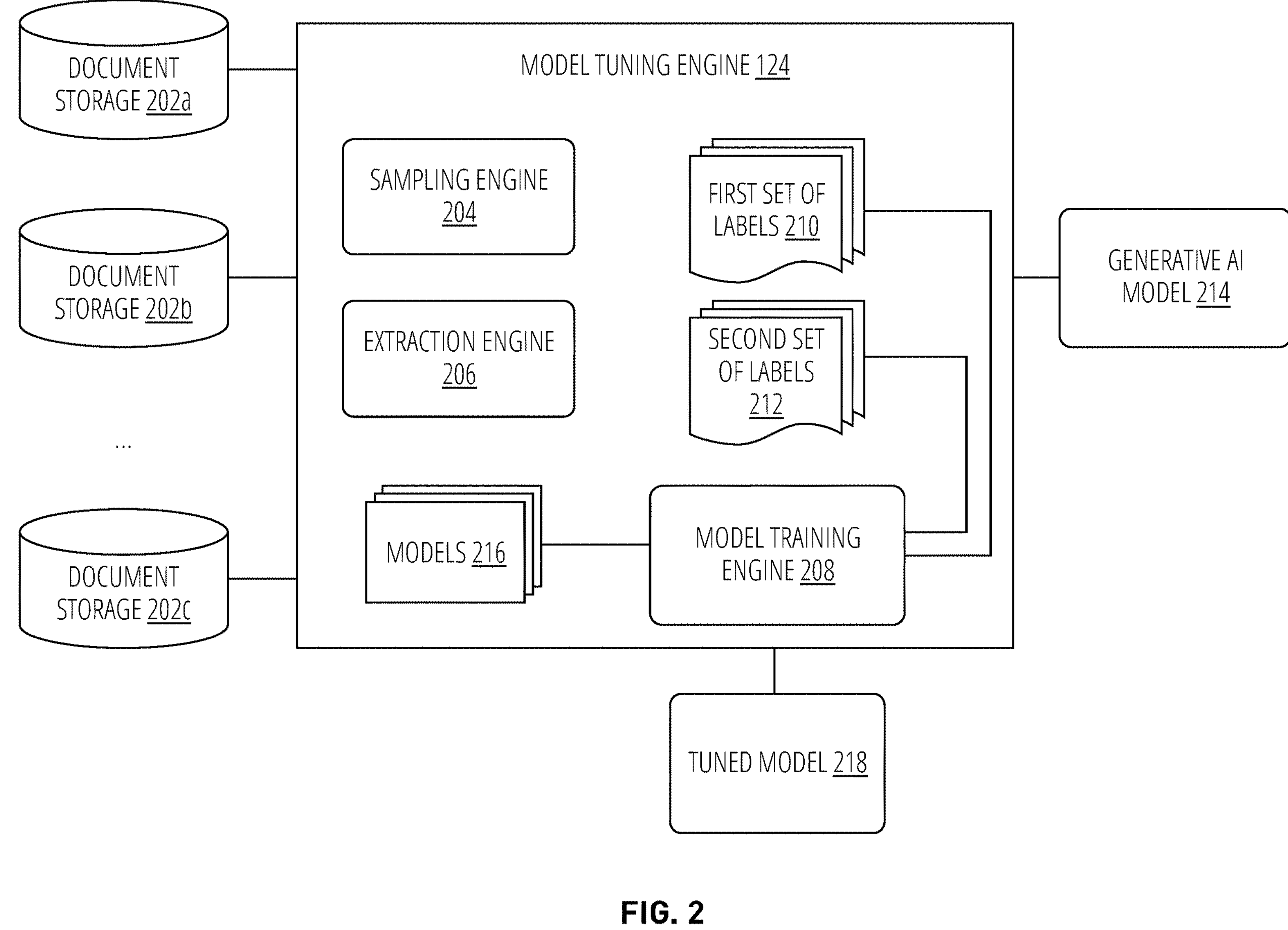
FIG. 2 illustrates example model tuning engine, according to some embodiments of the current subject matter.

FIG. 2 illustrates example model tuning engine 124, according to some embodiments of the current subject matter. The model tuning engine 124 may be communicatively coupled to one or more electronic document storage sources 202 (a, b, . . . c) and may include a sampling engine 204, an extraction engine 206, and a model training engine 208. The model tuning engine 124 may also be communicatively coupled to a generative AI model 214 for generation of one or more labels (e.g., first set of labels 210, second set of labels 212, etc.), as discussed herein. The generated labels may be used by the model training engine 208 of the model tuning engine 124 to train one or more models 216 to generate a tuned model 218.

One or more components of the system shown in FIG. 2 may be communicatively coupled using one or more communications networks. The communications networks may include one or more of the following: a wired network, a wireless network, a metropolitan area network ("MAN"), a local area network ("LAN"), a wide area network ("WAN"), a virtual local area network ("VLAN"), an internet, an extranet, an intranet, and/or any other type of network and/or any combination thereof.

Further, one or more components of the system shown in FIG. 2 may include any combination of hardware and/or software. In some embodiments, one or more components of the system may be disposed on one or more computing devices, such as, server(s), database(s), personal computer (s), laptop(s), cellular telephone(s), smartphone(s), tablet computer(s), virtual reality devices, and/or any other computing devices and/or any combination thereof. In some example embodiments, one or more components of the system may be disposed on a single computing device and/or may be part of a single communications network. Alternatively, or in addition to, such devices may be separately located from one another. A device may be a computing processor, a memory, a software functionality, a routine, a procedure, a call, and/or any combination thereof that may be configured to execute a particular function associated with interface and/or document certification processes disclosed herein.

In some embodiments, one or more components of the system shown in FIG. 2 may include network-enabled computers. As referred to herein, a network-enabled computer may include, but is not limited to a computer device, or communications device including, e.g., a server, a network appliance, a personal computer, a workstation, a phone, a smartphone, a handheld PC, a personal digital assistant, a thin client, a fat client, an Internet browser, or other device. One or more components of the system also may be mobile computing devices, for example, an iPhone, iPod, iPad from Apple® and/or any other suitable device running Apple's iOS® operating system, any device running Microsoft's Windows®. Mobile operating system, any device running Google's Android® operating system, and/or any other suitable mobile computing device, such as a smartphone, a tablet, or like wearable mobile device.

One or more components of the system shown in FIG. 2 may include a processor and a memory, and it is understood that the processing circuitry may contain additional components, including processors, memories, error and parity/CRC checkers, data encoders, anti-collision algorithms, controllers, command decoders, security primitives and tamperproofing hardware, as necessary to perform the interface and/or document certification functions described herein. One or more components of the system may further include one or more displays and/or one or more input devices. The displays may be any type of devices for presenting visual information such as a computer monitor, a flat panel display, and a mobile device screen, including liquid crystal displays, light-emitting diode displays, plasma panels, and cathode ray tube displays. The input devices may include any device for entering information into the user's device that is available and supported by the user's device, such as a touchscreen, keyboard, mouse, cursor-control device, touchscreen, microphone, digital camera, video recorder or camcorder. These devices may be used to enter information and interact with the software and other devices described herein.

In some example embodiments, one or more components of the system shown in FIG. 2 may execute one or more applications, such as software applications, that enable, for example, network communications with one or more components of system and transmit and/or receive data.

One or more components of the system shown in FIG. 2 may include and/or be in communication with one or more servers via one or more networks and may operate as a respective front-end to back-end pair with one or more servers. One or more components of the system may transmit, for example from a mobile device application (e.g., executing on one or more user devices, components, etc.), one or more requests to one or more servers. The requests may be associated with retrieving data from servers (e.g., retrieving one or more documents from document storage sources 202 (a, b, . . . c)). The servers may receive the requests from the components of the system. Based on the requests, servers may be configured to retrieve the requested data from one or more storage locations. Based on receipt of the requested data from the databases, the servers may be configured to transmit the received data to one or more components of the system, where the received data may be responsive to one or more requests.

The system shown in FIG. 2 may include one or more networks, such as, for example, networks that may be communicatively coupling the engine 124, the document storage sources 202 (a, b, . . . , c), the generative AI model 214, and/or any other computing components. In some embodiments, networks may be one or more of a wireless network, a wired network or any combination of wireless network and wired network and may be configured to connect the components of the system and/or the components of the system to one or more servers. For example, the networks may include one or more of a fiber optics network, a passive optical network, a cable network, an Internet network, a satellite network, a wireless local area network (LAN), a metropolitan area network (MAN), a wide area network (WAN), a virtual local area network (VLAN), an extranet, an intranet, a Global System for Mobile Communication, a Personal Communication Service, a Personal Area Network, Wireless Application Protocol, Multimedia Messaging Service, Enhanced Messaging Service, Short Message Service, Time Division Multiplexing based systems, Code Division Multiple Access based systems, D-AMPS, Wi-Fi, Fixed Wireless Data, IEEE 1002.11b, 1002.15.1, 1002.11n and 1002.11g, Bluetooth, NFC, Radio Frequency Identification (RFID), Wi-Fi, and/or any other type of network and/or any combination thereof.

In addition, the networks may include, without limitation, telephone lines, fiber optics, IEEE Ethernet 1002.3, a wide area network, a wireless personal area network, a LAN, or a global network such as the Internet. Further, the networks may support an Internet network, a wireless communication network, a cellular network, or the like, or any combination thereof. The networks may further include one network, or any number of the exemplary types of networks mentioned above, operating as a stand-alone network or in cooperation with each other. The networks may utilize one or more protocols of one or more network elements to which they are communicatively coupled. The networks may translate to or from other protocols to one or more protocols of network devices. The networks may include a plurality of interconnected networks, such as, for example, the Internet, a service provider's network, a cable television network, corporate networks, such as credit card association networks, and home networks.

The system shown in FIG. 2 may include one or more servers, which may include one or more processors that may be coupled to memory. Servers may be configured as a central system, server or platform to control and call various data at different times to execute a plurality of workflow actions. Servers may be configured to connect to the one or more databases. Servers may be incorporated into and/or communicatively coupled to at least one of the components of the system.

Further, one or more components of the system shown in FIG. 2 may be configured to execute one or more actions using one or more containers. In some embodiments, each action may be executed using its own container. A container may refer to a standard unit of software that may be configured to include the code that may be needed to execute the action along with all its dependencies. This may allow execution of actions to run quickly and reliably.

As shown in FIG. 2, the model tuning engine 124 may be configured to execute a query to retrieve one or more electronic documents from one or more electronic document storage sources 202 (a, b, . . . , c). Alternatively, or in addition, the electronic documents may be provided to the model tuning engine 124 without a query and/or any other type of request. The electronic document data sources 202 may be any type of data sources, e.g., databases, servers, and/or any other storage locations.

Some data sources (e.g., data storage sources 202*a* and/or 202*b*) may be configured to be public non-government databases, government databases (e.g., SEC-EDGAR, etc.), etc. that may store various electronic documents, such as, for instance, legal documents (e.g., commercial contracts, lease agreements, public disclosures (e.g., 10 k statements, 5 k statements, quarterly reports, etc.). The electronic documents stored in these databases may be identified using various identifiers, which may allow location of these documents in the databases, however, contents of electronic documents stored therein might not be parsed and/or specifically identified. For example, a review of the entire electronic document (e.g., 10*k* statement of a company stored in SEC-EDGARD database) may need to be performed to identify a particular section (e.g., a section related to compensation of executives for the company).

Other data sources, e.g., data storage source 202*c*, may be configured to be private databases, access to which might not be publicly available (e.g., internal company databases, specific user access databases, etc.). The electronic documents stored in these databases may be organized in a predetermined fashion, which may allow ease of access to the electronic documents and/or any portions thereof. For example, electronic documents stored in these databases may be searchable. The documents may be stored in a particular electronic format (e.g., PDF, .docx, etc.). One or more portions or snippets of documents may be assigned a particular token and/or identifier and/or any other input text, which may be used to locate specific portions of such documents and quickly retrieve them.

Document portions in the data storage source 202*c* may be stored and/or identified based on one or more machine learning (ML) models. The ML models may be trained using one or more features associated with electronic documents, portions of documents, etc. For example, the features may include at least one of: type(s) of electronic document(s), various content elements of electronic document(s), type(s) of task(s) that may have been associated with the electronic documents, position(s) of elements in document(s), types of element(s), function(s) of element(s), and/or any other features and/or any combination thereof. The models may be trained using historical data associated with prior tasks, use of document(s), and/or any other information. Moreover, the training may involve re-training and/or refresh-training based on use of models/user feedback, etc.

Upon receiving the electronic documents from the sources 202*a* and 202*b*, the sampling engine 204 of the model tuning engine 124 may be configured to execute sampling of the electronic documents to generate one or more sampled documents. The sampled documents may be a smaller set of the received electronic documents from data sources 202*a* and 202*b*. In some example embodiments, to execute sampling, the sampling engine 204 may be configured to identify one or more context-based portions of the electronic documents received from data sources 202*a*, 202*b*. Context-based portions may be identified using various searches of documents that may use one or more keywords as parameters of the searches (e.g., a query of "find termination clause of a lease agreement" may use "termination" as one of the keywords). The sampling engine 204 may be configured to assign one or more identifiers to the identified context-based portions and may then generate sampled electronic documents using the assigned identifiers. The sampled electronic document(s) may correspond to one or more context-based portions.

Once the set of sampled electronic documents has been generated, the sampling engine 204 may be configured to send these electronic documents to the generative AI model 214 for processing. The generative AI model 214 may be part of the current subject matter system and/or be one or more third party models (e.g., ChatGPT, Bard, DALL-E, Midjourney, DeepMind, etc.). In some embodiments, the generative AI model 214 may be provided with the sampled electronic documents and/or any portions thereof and may use the provided information to generate one or more first set of labels 210. For example, the generative AI model may be provided with the sales agreement, one or more selected portions of the agreement related to termination, and may be instructed to generate labels that may be specific to the termination provisions. The first set of labels 210 may be returned to the model tuning engine 124 for the purposes of training a large language model (e.g., models 216).

As stated above, the model tuning engine 124 may be configured to receive electronic documents from the data source 202*c*, which may be different from the data sources 202*a* and/or 202*b*. These electronic documents may be queried by the engine 124 and/or received by the engine 124 without a query. The electronic documents stored in the data source 202*c* may be tokenized, whereby one or more portions of such documents may be assigned a specific token and/or identifier and/or other input that identifies a portion of the document (e.g., termination clause of a lease agreement may be identified by a "termination" token).

Using tokens, the extraction engine 206 of the model tuning engine 124 may be configured to extract one or more portions from electronic documents received from the data source 202*c*. For example, a "termination" token may be used to retrieve clauses related to term and/or termination of any agreements that may have been received from the data source 202*c*. The extraction engine 206 may be configured to send the extracted portions to the generative AI model 214 for processing. The generative AI model 214 that may receive extracted portions from the extraction engine 206 may be the same and/or different than the generative AI model 214 that may receive sampled electronic documents from the sampling engine 204.

The extraction engine 206 may be configured to instruct the generative AI model 214 to generate one or more second sets of labels 212 based on the extracted portions of electronic documents. Once generated, the second set of labels 212 may then be returned to the model tuning engine 124 for use in training one or more large language models.

The model training engine 208 of the model tuning engine 124 may use the first set of labels 210 and the second set of labels 212 to train one or more large language models 216. The models 216 may be selected by the model tuning engine 124 and/or provided to the model tuning engine 124 for training (or "fine tuning"). Training of the models 216 may be configured to improve the models 216 ability to identify specific portions of electronic documents in response to queries (e.g., "identify a termination provision of a lease agreement"). The training process may be executed by the model training engine 208 once and/or continuously, such as, for example, upon receiving updated first set of labels 210 and/or second set of labels 212. Moreover, the training process may also be based on user feedback. The feedback may be submitted on the first set of labels 210 and/or second set of labels 212 and/or the trained models 216. For example, the feedback may include a vote, written feedback, a "thumbs up", "thumbs down", etc. The feedback may be used to update, revise, modify, delete, change, and/or perform any other operations with regard to first set of labels 210, second set of labels 212, trained models 216, and/or the training process performed by the model training engine 208. Alternatively, or in addition, the feedback may be used to update, revise, modify, delete, change, and/or perform any other operations with regard to a particular output that may have been generated during generation of labels 210, 212, and/or training of models 216. Such operations (e.g., updates, revision, etc. to how operations are performed and to the output) may be performed simultaneously, one after the other, and/or in any other desired fashion. Further, these operations may be executed in real-time, as soon as feedback is received, and/or at any other desired time. In some example embodiments, the feedback may be fed back into one or more of the previous phases, and may be used to adjust and/or finetune, for example, how labels may be generated, how portions of document may be identified, extracted, and/or processed, how processing of specific tasks may be performed using the generative AI model, etc. User feedback may be used to update the labels, trained models, train and/or re-train and/or refresh train one or more models used for selection of portions of document to improve identification, extraction, etc. of portions of documents, refine prompts submitted to the generative AI models, and/or for any other purpose(s).

As a result of the training performed by the model training engine 208, the model tuning engine 124 may be configured to output a tuned model 218. As stated above, the tuned model 218 may be used for processing of queries related to electronic documents. For example, the tuned model 218 may be used to process large legal agreements that may include a multitude of complex provisions that may be interconnected.

In some embodiments, the model tuning engine 124 may be configured to rely on one or more machine learning models. For example, such models may be used to identify portions of documents received from data sources 202*a*, 202*b*. Alternatively, or in addition, the models may be used for extracting of portions of electronic documents received from data source 202*c*. Further, the models may be used for generation of prompts to the generative AI model 214 for creation first set of labels 210 and/or second set of labels 212, as well as for performing of any other tasks by the model tuning engine 124.

Figure 3:
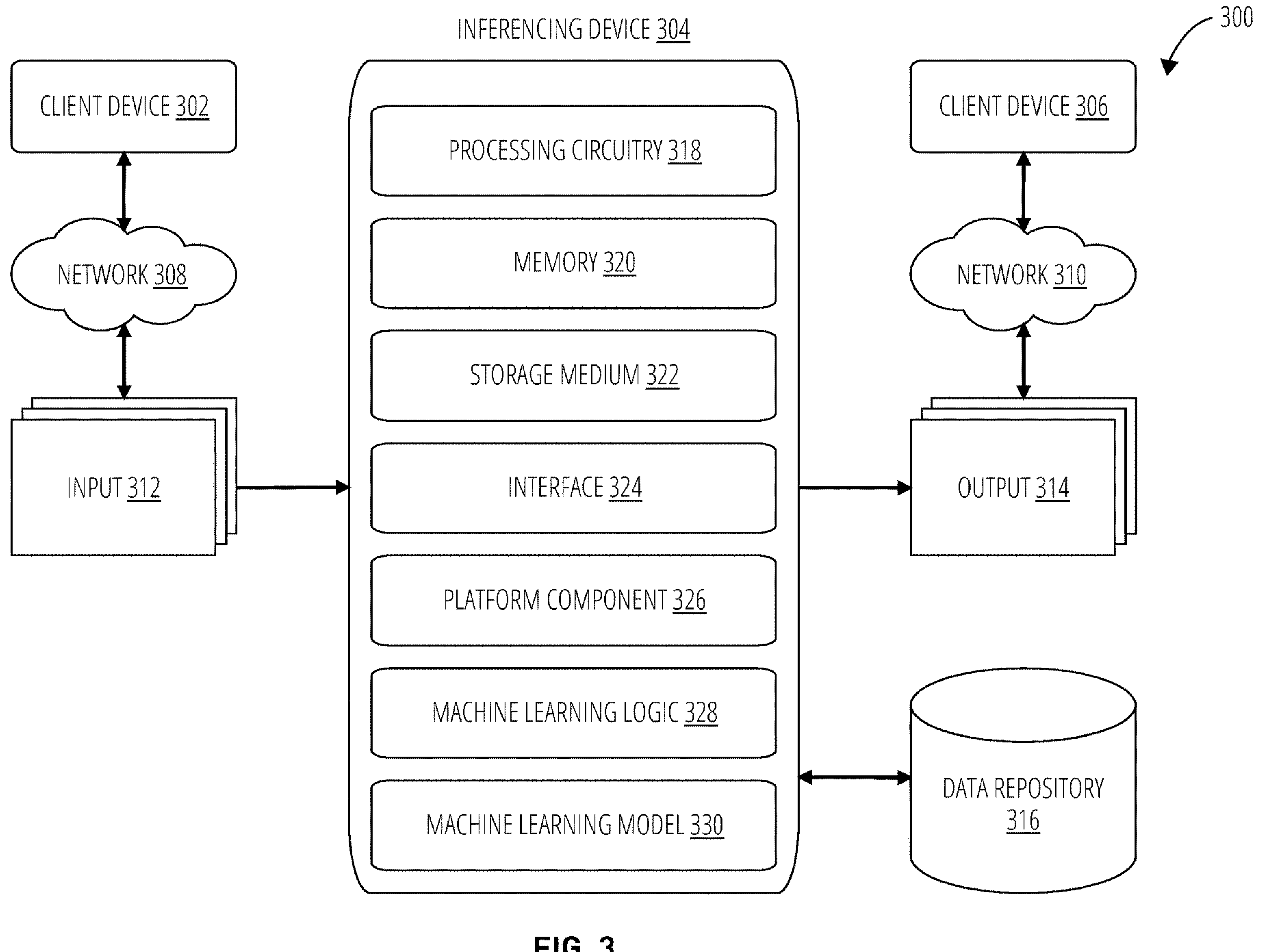
FIG. 3 illustrates an example of an AI/ML system that may be used for generating one or more transaction packages and/or guiding the user through one or more tasks, documents, etc., according to some embodiments of the current subject matter.

FIG. 3 illustrates an example of an AI/ML system 300 that may be used by the model tuning engine 124, according to some embodiments of the current subject matter. The system 300 may include a set of M devices, where M is any positive integer. As shown in FIG. 3, the system 300 may include three devices (M=3), such as a client device 302, an inferencing device 304, and a client device 306. The inferencing device 304 may communicate information with the client device 302 and the client device 306 over a network 308 and a network 310, respectively. The information may include input 312 from the client device 302 and output 314 to the client device 306, or vice-versa. In some embodiments, the input 312 and the output 314 may be communicated between the same client device 302 or client device 306. In another alternative, the input 312 and the output 314 may be stored in a data repository 316. Alternatively, or in addition, the input 312 and the output 314 are communicated via a platform component 326 of the inferencing device 304, such as an input/output (I/O) device (e.g., a touchscreen, a microphone, a speaker, etc.).

As shown in FIG. 3, the inferencing device 304 may include a processing circuitry 318, a memory 320, a storage medium 322, an interface 324, a platform component 326, ML logic 328, and an ML model 330. In some embodiments, the inferencing device 304 may include other components and/or devices as well. Examples for software elements and hardware elements of the inferencing device 304 are described in more detail with reference to a computing architecture 1800 as depicted in FIG. 18. Embodiments are not limited to these examples.

The inferencing device 304 may generally be arranged to receive an input 312, process the input 312 via one or more AI/ML techniques, and send an output 314. The inferencing device 304 may receive the input 312 from the client device 302 via the network 308, the client device 306 via the network 310, the platform component 326 (e.g., a touchscreen as a text command or microphone as a voice command), the memory 320, the storage medium 322 or the data repository 316. The inferencing device 304 may send the output 314 to the client device 302 via the network 308, the client device 306 via the network 310, the platform component 326 (e.g., a touchscreen to present text, graphic or video information or speaker to reproduce audio information), the memory 320, the storage medium 322 or the data repository 316. Examples for the software elements and hardware elements of the network 308 and the network 310 are described in more detail with reference to a communications architecture 1900 as depicted in FIG. 19. Embodiments are not limited to these examples.

The inferencing device 304 may include ML logic 328 and an ML model 330 to implement various AI/ML techniques for various AI/ML tasks. The ML logic 328 may receive the input 312 and process the input 312 using the ML model 330. The ML model 330 may perform inferencing operations to generate an inference for a specific task from the input 312. In some embodiments, the inference is part of the output 314. The output 314 may be used by the client device 302, the inferencing device 304, or the client device 306 to perform subsequent actions in response to the output 314.

In some embodiments, the ML model 330 may be a trained ML model 330 using a set of training operations. An example of training operations to train the ML model 330 is described with reference to FIG. 4.

Figure 4:
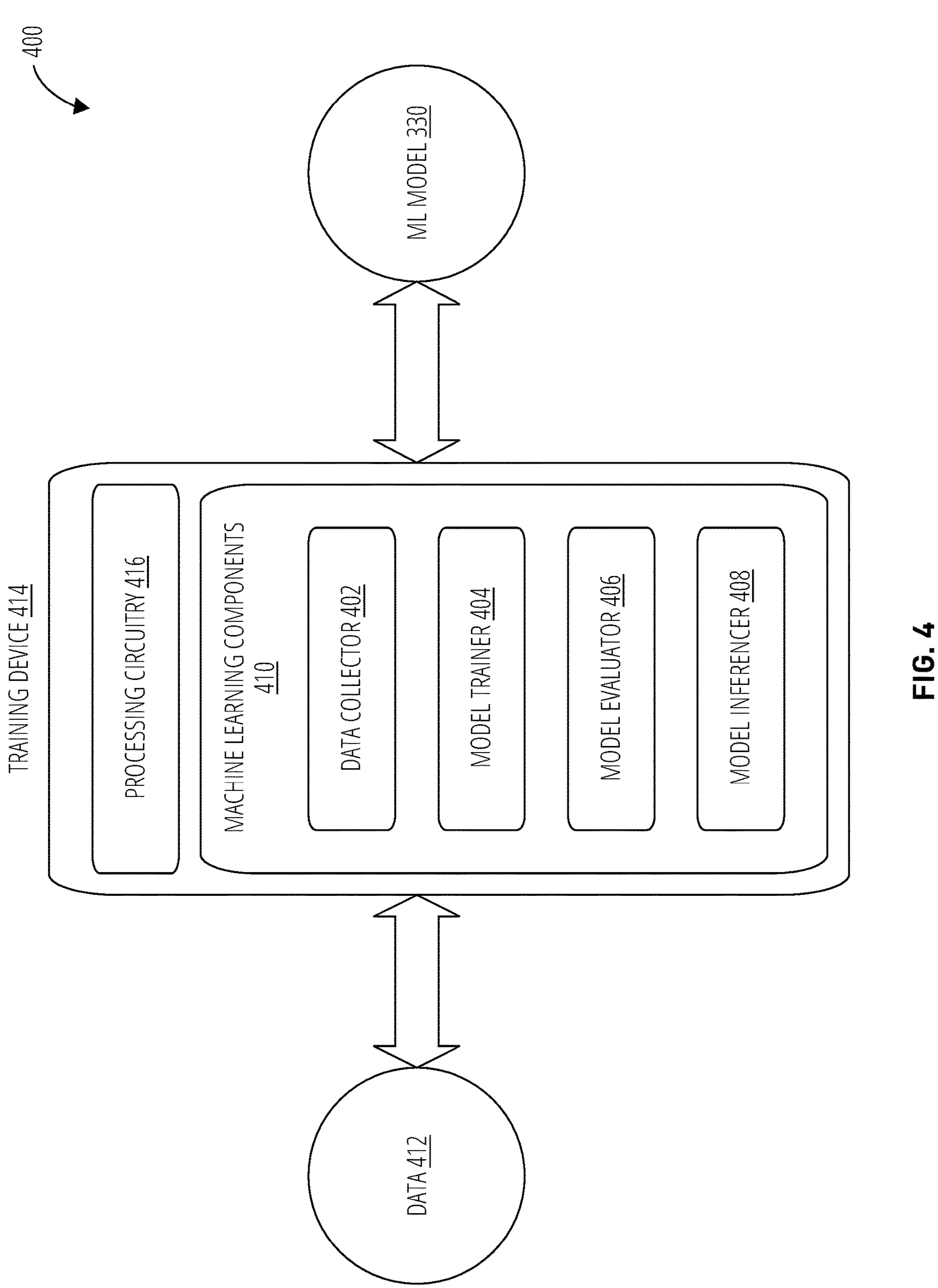
FIG. 4 illustrates an example apparatus that may include a training device suitable to generate a trained ML model for the inferencing device of the system shown in FIG. 3.

FIG. 4 illustrates an example apparatus 400 that may include a training device 414 suitable to generate a trained ML model 330 for the inferencing device 304 of the system 300. As shown in FIG. 4, the training device 414 may include a processing circuitry 416 and a set of ML components 410 to support various AI/ML techniques, such as a data collector 402, a model trainer 404, a model evaluator 406 and a model inferencer 408.

In general, the data collector 402 may collect data 412 from one or more data sources to use as training data for the ML model 330. The data collector 402 may collect different types of data 412, such as, text information, audio information, image information, video information, graphic information, and so forth. The model trainer 404 may receive as input the collected data and uses a portion of the collected data as test data for an AI/ML algorithm to train the ML model 330. The model evaluator 406 may evaluate and improve the trained ML model 330 using a portion of the collected data as test data to test the ML model 330. The model evaluator 406 may also use feedback information from the deployed ML model 330. The model inferencer 408 may implement the trained ML model 330 to receive as input new unseen data, generate one or more inferences on the new data, and output a result such as an alert, a recommendation or other post-solution activity.

An exemplary AI/ML architecture for the ML components 410 is described in more detail with reference to FIG. 5.

FIG. 5 illustrates an artificial intelligence architecture 500 that may be used by the training device 414 to generate the ML model 330 (e.g., one or more models that may be used by the model tuning engine 124 for identification of document portions of electronic documents received from data sources 202*a*, 202*b*, extraction of portions of documents from electronic documents received from data source 202*c*, etc.) for deployment by the inferencing device 304. The artificial intelligence architecture 500 is an example of a system suitable for implementing various AI techniques and/or ML techniques to perform various inferencing tasks on behalf of the various devices of the system 100.

AI is a science and technology based on principles of cognitive science, computer science and other related disciplines, which deals with the creation of intelligent machines that work and react like humans. AI is used to develop systems that can perform tasks that require human intelligence such as recognizing speech, vision and making decisions. AI can be seen as the ability for a machine or computer to think and learn, rather than just following instructions. ML is a subset of AI that uses algorithms to enable machines to learn from existing data and generate insights or predictions from that data. ML algorithms are used to optimize machine performance in various tasks such as classifying, clustering and forecasting. ML algorithms are used to create ML models that can accurately predict outcomes.

In general, the artificial intelligence architecture 500 may include various machine or computer components (e.g., circuit, processor circuit, memory, network interfaces, compute platforms, input/output (I/O) devices, etc.) for an AI/ML system that are designed to work together to create a pipeline that can take in raw data, process it, train an ML model 330, evaluate performance of the trained ML model 330, and deploy the tested ML model 330 as the trained ML model 330 in a production environment, and continuously monitor and maintain it.

The ML model 330 may be a mathematical construct used to predict outcomes based on a set of input data. The ML model 330 may be trained using large volumes of training data 526, and it can recognize patterns and trends in the training data 526 to make accurate predictions. The ML model 330 may be derived from an ML algorithm 524 (e.g., a neural network, decision tree, support vector machine, etc.). A data set is fed into the ML algorithm 524 which trains an ML model 330 to "learn" a function that produces mappings between a set of inputs and a set of outputs with a reasonably high accuracy. Given a sufficiently large enough set of inputs and outputs, the ML algorithm 524 may find the function for a given task. This function may even be able to produce the correct output for input that it has not seen during training. A data scientist prepares the mappings, selects and tunes the ML algorithm 524, and evaluates the resulting model performance. Once the ML logic 328 is sufficiently accurate on test data, it can be deployed for production use.

The ML algorithm 524 may include any ML algorithm suitable for a given AI task. Examples of ML algorithms may include supervised algorithms, unsupervised algorithms, or semi-supervised algorithms.

A supervised algorithm is a type of machine learning algorithm that uses labeled data to train a machine learning model. In supervised learning, the machine learning algorithm is given a set of input data and corresponding output data, which are used to train the model to make predictions or classifications. The input data is also known as the features, and the output data is known as the target or label. The goal of a supervised algorithm is to learn the relationship between the input features and the target labels, so that it can make accurate predictions or classifications for new, unseen data. Examples of supervised learning algorithms include: (1) linear regression which is a regression algorithm used to predict continuous numeric values, such as stock prices or temperature; (2) logistic regression which is a classification algorithm used to predict binary outcomes, such as whether a customer will purchase or not purchase a product; (3) decision tree which is a classification algorithm used to predict categorical outcomes by creating a decision tree based on the input features; or (4) random forest which is an ensemble algorithm that combines multiple decision trees to make more accurate predictions.

An unsupervised algorithm is a type of machine learning algorithm that is used to find patterns and relationships in a dataset without the need for labeled data. Unlike supervised learning, where the algorithm is provided with labeled training data and learns to make predictions based on that data, unsupervised learning works with unlabeled data and seeks to identify underlying structures or patterns. Unsupervised learning algorithms use a variety of techniques to discover patterns in the data, such as clustering, anomaly detection, and dimensionality reduction. Clustering algorithms group similar data points together, while anomaly detection algorithms identify unusual or unexpected data points. Dimensionality reduction algorithms are used to reduce the number of features in a dataset, making it easier to analyze and visualize. Unsupervised learning has many applications, such as in data mining, pattern recognition, and recommendation systems. It is particularly useful for tasks where labeled data is scarce or difficult to obtain, and where the goal is to gain insights and understanding from the data itself rather than to make predictions based on it.

Semi-supervised learning is a type of machine learning algorithm that combines both labeled and unlabeled data to improve the accuracy of predictions or classifications. In this approach, the algorithm is trained on a small amount of labeled data and a much larger amount of unlabeled data. The main idea behind semi-supervised learning is that labeled data is often scarce and expensive to obtain, whereas unlabeled data is abundant and easy to collect. By leveraging both types of data, semi-supervised learning can achieve higher accuracy and better generalization than either supervised or unsupervised learning alone. In semi-supervised learning, the algorithm first uses the labeled data to learn the underlying structure of the problem. It then uses this knowledge to identify patterns and relationships in the unlabeled data, and to make predictions or classifications based on these patterns. Semi-supervised learning has many applications, such as in speech recognition, natural language processing, and computer vision. It is particularly useful for tasks where labeled data is expensive or time-consuming to obtain, and where the goal is to improve the accuracy of predictions or classifications by leveraging large amounts of unlabeled data.

The ML algorithm 524 of the artificial intelligence architecture 500 is implemented using various types of ML algorithms including supervised algorithms, unsupervised algorithms, semi-supervised algorithms, or a combination thereof. A few examples of ML algorithms include support vector machine (SVM), random forests, naïve Bayes, K-means clustering, neural networks, and so forth. A SVM is an algorithm that can be used for both classification and regression problems. It works by finding an optimal hyperplane that maximizes the margin between the two classes. Random forests is a type of decision tree algorithm that is used to make predictions based on a set of randomly selected features. Naive Bayes is a probabilistic classifier that makes predictions based on the probability of certain events occurring. K-Means Clustering is an unsupervised learning algorithm that groups data points into clusters. Neural networks is a type of machine learning algorithm that is designed to mimic the behavior of neurons in the human brain. Other examples of ML algorithms include a support vector machine (SVM) algorithm, a random forest algorithm, a naive Bayes algorithm, a K-means clustering algorithm, a neural network algorithm, an artificial neural network (ANN) algorithm, a convolutional neural network (CNN) algorithm, a recurrent neural network (RNN) algorithm, a long short-term memory (LSTM) algorithm, a deep learning algorithm, a decision tree learning algorithm, a regression analysis algorithm, a Bayesian network algorithm, a genetic algorithm, a federated learning algorithm, a distributed artificial intelligence algorithm, and so forth. Embodiments are not limited in this context.

As depicted in FIG. 5, the artificial intelligence architecture 500 includes a set of data sources 502 to source data 504 for the artificial intelligence architecture 500. Data sources 502 may comprise any device capable generating, processing, storing or managing data 504 suitable for a ML system. The data sources 502 may receive data 550 associated with documents (e.g., type of documents, portion(s) of document content(s) and/or entire contents of document(s), transactions data (e.g., type of transaction, transaction identifier, requests associated with the transaction, etc.), and/or any other data. It should be noted that the data 550 may also be supplied during training phase of the model. Some additional, non-limiting, examples of data sources 502 include without limitation databases, web scraping, sensors and Internet of Things (IoT) devices, image and video cameras, audio devices, text generators, publicly available databases, private databases, and many other data sources 502. The data sources 502 may be remote from the artificial intelligence architecture 500 and accessed via a network, local to the artificial intelligence architecture 500 an accessed via a network interface or may be a combination of local and remote data sources 502.

The data sources 502 source difference types of data 504 (which may include data 550 related to documents, transactions, etc.). By way of example and not limitation, the data 504 includes structured data from relational databases, such as customer profiles, transaction histories, or product inventories. The data 504 includes unstructured data from websites such as customer reviews, news articles, social media posts, or product specifications. The data 504 includes data from temperature sensors, motion detectors, and smart home appliances. The data 504 includes image data from medical images, security footage, or satellite images. The data 504 includes audio data from speech recognition, music recognition, or call centers. The data 504 includes text data from emails, chat logs, customer feedback, news articles or social media posts. The data 504 includes publicly available datasets such as those from government agencies, academic institutions, or research organizations. These are just a few examples of the many sources of data that can be used for ML systems. It is important to note that the quality and quantity of the data is critical for the success of a machine learning project.

The data 504 is typically in different formats such as structured, unstructured or semi-structured data. Structured data refers to data that is organized in a specific format or schema, such as tables or spreadsheets. Structured data has a well-defined set of rules that dictate how the data should be organized and represented, including the data types and relationships between data elements. Unstructured data refers to any data that does not have a predefined or organized format or schema. Unlike structured data, which is organized in a specific way, unstructured data can take various forms, such as text, images, audio, or video. Unstructured data can come from a variety of sources, including social media, emails, sensor data, and website content. Semi-structured data is a type of data that does not fit neatly into the traditional categories of structured and unstructured data. It has some structure but does not conform to the rigid structure of a traditional relational database. Semi-structured data is characterized by the presence of tags or metadata that provide some structure and context for the data.

The data sources 502 may be communicatively coupled to a data collector 402. The data collector 402 may gather relevant data 504 from the data sources 502. Once collected, the data collector 402 may use a pre-processor 506 to make the data 504 suitable for analysis. This may involve data cleaning, transformation, and feature engineering. Data preprocessing is a critical step in ML as it directly impacts the accuracy and effectiveness of the ML model 330. The pre-processor 506 receives the data 504 as input, processes the data 504, and outputs pre-processed data 516 for storage in a database 508. Examples for the database 508 includes a hard drive, solid state storage, and/or random-access memory (RAM).

The data collector 402 is communicatively coupled to a model trainer 404. The model trainer 404 may perform AI/ML model training, validation, and testing which may generate model performance metrics as part of the model testing procedure. The model trainer 404 may receive the pre-processed data 516 as input 510 or via the database 508. The model trainer 404 may implement a suitable ML algorithm 524 to train an ML model 330 on a set of training data 526 from the pre-processed data 516. The training process may involve feeding the pre-processed data 516 into the ML algorithm 524 to produce or optimize an ML model 330. The training process may adjust its parameters until it achieves an initial level of satisfactory performance.

The model trainer 404 may be communicatively coupled to a model evaluator 406. After an ML model 330 is trained, the ML model 330 may need to be evaluated to assess its performance. This is done using various metrics such as accuracy, precision, recall, and F1 score. The model trainer 404 may output the ML model 330, which is received as input 510 or from the database 508. The model evaluator 406 may receive the ML model 330 as input 512, and it initiates an evaluation process to measure performance of the ML model 330. The evaluation process may include providing feedback 518 to the model trainer 404. The model trainer 404 may re-train the ML model 330 to improve performance in an iterative manner.

The model evaluator 406 may be communicatively coupled to the model inferencer 408. The model inferencer 408 may provide AI/ML model inference output (e.g., inferences, predictions or decisions). Once the ML model 330 is trained and evaluated, it may be deployed in a production environment where it is used to make predictions on new data. The model inferencer 408 may receive the evaluated ML model 330 as input 514. The model inferencer 408 may use the evaluated ML model 330 to produce insights or predictions on real data, which may be deployed as a final production ML model 330. The inference output of the ML model 330 may be use case specific. The model inferencer 408 may also perform model monitoring and maintenance, which involves continuously monitoring performance of the ML model 330 in the production environment and making any necessary updates or modifications to maintain its accuracy and effectiveness. The model inferencer 408 may provide feedback 518 to the data collector 402 to train or re-train the ML model 330. The feedback 518 may include model performance feedback information, which may be used for monitoring and improving performance of the ML model 330.

Some or all of the model inferencer 408 may be implemented by various actors 522 in the artificial intelligence architecture 500, including the ML model 330 of the inferencing device 304, for example. The actors 522 may use the deployed ML model 330 on new data to make inferences or predictions for a given task and output an insight 532. The actors 522 may implement the model inferencer 408 locally, or remotely receives outputs from the model inferencer 408 in a distributed computing manner. The actors 522 may trigger actions directed to other entities or to itself. The actors 522 provide feedback 520 to the data collector 402 via the model inferencer 408. The feedback 520 may include data needed to derive training data, inference data or to monitor the performance of the ML model 330 and its impact to the network through updating of key performance indicators (KPIs) and performance counters.

As discussed above, the systems 100, 300 implement some or all of the artificial intelligence architecture 500 to support various use cases and solutions for various AI/ML tasks. In some embodiments, the training device 414 of the apparatus 400 may use the artificial intelligence architecture 500 to generate and train the ML model 330 for use by the inferencing device 304 for the system 100. In one embodiment, for example, the training device 414 may train the ML model 330 as a neural network, as described in more detail with reference to FIG. 6. Other use cases and solutions for AI/ML are possible as well, and embodiments are not limited in this context.

Figure 6:
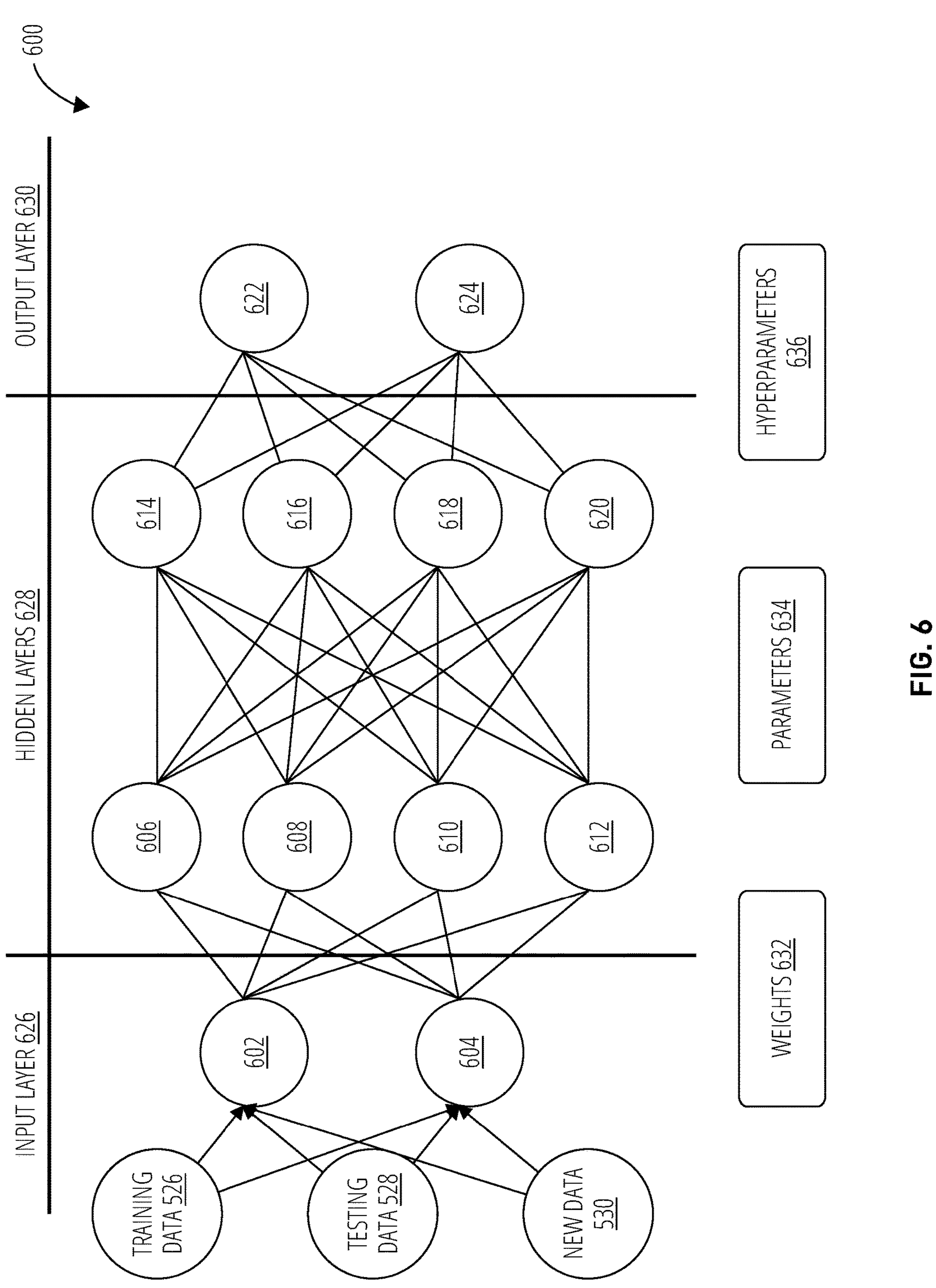
FIG. 6 illustrates an artificial neural network in accordance with one embodiment.

FIG. 6 illustrates an embodiment of an artificial neural network 600. Neural networks, also known as artificial neural networks (ANNs) or simulated neural networks (SNNs), are a subset of machine learning and are at the core of deep learning algorithms. Their name and structure are inspired by the human brain, mimicking the way that biological neurons signal to one another.

Artificial neural network 600 may include multiple node layers, containing an input layer 626, one or more hidden layers 628, and an output layer 630. Each layer comprises one or more nodes, such as nodes 602 to 624. As shown in FIG. 6, for example, the input layer 626 may include nodes 602, 604. The artificial neural network 600 may include two hidden layers 628, with a first hidden layer having nodes 606, 608, 610 and 612, and a second hidden layer having nodes 614, 616, 618 and 620. The artificial neural network 600 may include an output layer 630 with nodes 622, 624. Each node 602 to 624 may include a processing element (PE), or artificial neuron, which connects to another and has an associated weight and threshold. If the output of any individual node is above the specified threshold value, that node may be activated, sending data to the next layer of the network. Otherwise, no data is passed along to the next layer of the network.

In general, artificial neural network 600 may rely on training data 526 to learn and improve accuracy over time. However, once the artificial neural network 600 may be fine-tuned for accuracy, and tested on testing data 528, the artificial neural network 600 may be ready to classify and cluster new data 530 at a high velocity. Tasks in speech recognition or image recognition can take minutes versus hours when compared to the manual identification by human experts.

Each individual node 602 to 424 may be a linear regression model, composed of input data, weights, a bias (or threshold), and an output. The linear regression model may have a formula similar to Equation (1), as follows:

$$\sum wixi + \text{bias} = w1x1 + w2x2 + w3x3 + \text{bias output} = f(x) = 1 \text{ if } \sum w1x1 + b >= 0; 0 \text{ if } \sum w1x1 + b < 0 \quad \text{EQUATION (1)}$$

Once an input layer 626 is determined, a set of weights 632 may be assigned. The weights 632 help determine the importance of any given variable, with larger ones contributing more significantly to the output compared to other inputs. All inputs are then multiplied by their respective weights and then summed. Afterward, the output is passed through an activation function, which determines the output.

If that output exceeds a given threshold, it "fires" (or activates) the node, passing data to the next layer in the network. This results in the output of one node becoming in the input of the next node. The process of passing data from one layer to the next layer defines the artificial neural network 600 as a feedforward network.

In some embodiments, the artificial neural network 600 may leverage sigmoid neurons, which are distinguished by having values between 0 and 1. Since the artificial neural network 600 behaves similarly to a decision tree, cascading data from one node to another, having x values between 0 and 1 will reduce the impact of any given change of a single variable on the output of any given node, and subsequently, the output of the artificial neural network 600.

The artificial neural network 600 may have many practical use cases, like image recognition, speech recognition, text recognition or classification. The artificial neural network 600 leverages supervised learning, or labeled datasets, to train the algorithm. As the model is trained, its accuracy is measured using a cost (or loss) function. This is also commonly referred to as the mean squared error (MSE). An example of a cost function is shown in Equation (2), as follows:

$$\text{Cost Function } = MSE = \frac{1}{2m}\sum_{i=1}^{m}(\hat{y}_i - y_i)^2 \rightarrow \text{MIN} \qquad \text{EQUATION (2)}$$

Where i represents the index of the sample, y-hat is the predicted outcome, y is the actual value, and m is the number of samples.

Ultimately, the goal is to minimize the cost function to ensure correctness of fit for any given observation. As the model adjusts its weights and bias, it uses the cost function and reinforcement learning to reach the point of convergence, or the local minimum. The process in which the algorithm adjusts its weights is through gradient descent, allowing the model to determine the direction to take to reduce errors (or minimize the cost function). With each training example, the parameters 634 of the model adjust to gradually converge at the minimum.

In one embodiment, the artificial neural network 600 is feedforward, meaning it flows in one direction only, from input to output. In one embodiment, the artificial neural network 600 uses backpropagation. Backpropagation is when the artificial neural network 600 moves in the opposite direction from output to input. Backpropagation allows calculation and attribution of errors associated with each neuron 602 to 624, thereby allowing adjustment to fit the parameters 634 of the ML model 330 appropriately.

The artificial neural network 600 is implemented as different neural networks depending on a given task. Neural networks are classified into different types, which are used for different purposes. In one embodiment, the artificial neural network 600 is implemented as a feedforward neural network, or multi-layer perceptrons (MLPs), comprised of an input layer 626, hidden layers 628, and an output layer 630. While these neural networks are also commonly referred to as MLPs, they are actually comprised of sigmoid neurons, not perceptrons, as most real-world problems are nonlinear. Trained data 504 usually is fed into these models to train them, and they are the foundation for computer vision, natural language processing, and other neural networks. In one embodiment, the artificial neural network 600 is implemented as a convolutional neural network (CNN). A CNN is similar to feedforward networks, but usually utilized for image recognition, pattern recognition, and/or computer vision. These networks harness principles from linear algebra, particularly matrix multiplication, to identify patterns within an image. In one embodiment, the artificial neural network 600 is implemented as a recurrent neural network (RNN). A RNN is identified by feedback loops. The RNN learning algorithms are primarily leveraged when using time-series data to make predictions about future outcomes, such as stock market predictions or sales forecasting. The artificial neural network 600 is implemented as any type of neural network suitable for a given operational task of system 100, and the MLP, CNN, and RNN are merely a few examples. Embodiments are not limited in this context.

The artificial neural network 600 may include a set of associated parameters 634. There are a number of different parameters that must be decided upon when designing a neural network. Among these parameters are the number of layers, the number of neurons per layer, the number of training iterations, and so forth. Some of the more important parameters in terms of training and network capacity are a number of hidden neurons parameter, a learning rate parameter, a momentum parameter, a training type parameter, an Epoch parameter, a minimum error parameter, and so forth.

In some embodiments, the artificial neural network 600 may be implemented as a deep learning neural network. The term deep learning neural network refers to a depth of layers in a given neural network. A neural network that has more than three layers-which would be inclusive of the inputs and the output—can be considered a deep learning algorithm. A neural network that only has two or three layers, however, may be referred to as a basic neural network. A deep learning neural network may tune and optimize one or more hyperparameters 636. A hyperparameter is a parameter whose values are set before starting the model training process. Deep learning models, including convolutional neural network (CNN) and recurrent neural network (RNN) models can have anywhere from a few hyperparameters to a few hundred hyperparameters. The values specified for these hyperparameters impacts the model learning rate and other regulations during the training process as well as final model performance. A deep learning neural network uses hyperparameter optimization algorithms to automatically optimize models. The algorithms used include Random Search, Tree-structured Parzen Estimator (TPE) and Bayesian optimization based on the Gaussian process. These algorithms are combined with a distributed training engine for quick parallel searching of the optimal hyperparameter values.

FIG. 7 illustrates an example of a document corpus 708 suitable for use by the model tuning engine 124 of the server device 102. The document corpus 708 may be stored in one or more database and/or storage locations and may be accessible (e.g., via a query) by the model tuning engine 124. In general, a document corpus is a large and structured collection of electronic documents, such as text documents, that are typically used for natural language processing (NLP) tasks such as text classification, sentiment analysis, topic modeling, and information retrieval. A corpus can include a variety of document types such as web pages, books, news articles, social media posts, scientific papers, and more. The corpus may be created for a specific domain or purpose, and it may be annotated with metadata or labels to facilitate analysis. Document corpora are commonly used in research and industry to train machine learning models and to develop NLP applications.

As shown in FIG. 7, the document corpus 708 may include information from electronic documents 718 derived from the document records 138 stored in the data store 126.

The electronic documents 718 may include any electronic document having metadata such as STME 132 suitable for receiving an electronic signature, including both signed electronic documents or unsigned electronic documents. Different sets of the electronic documents 718 of the document corpus 708 may be associated with different entities. For example, a first set of electronic documents 718 is associated with a company A 702. A second set of electronic documents 718 is associated with a company B 704. A third set of electronic documents 718 is associated with a company C 706. A fourth set of electronic documents 718 is associated with a company D 710. Although some embodiments discuss the document corpus 708 having electronic documents 718, it may be appreciated that the document corpus 708 may have unsigned electronic document as well, which may be mined using the AI/ML techniques described herein. Embodiments are not limited in this context.

Each set of electronic documents 718 associated with a defined entity may include one or more subsets of the electronic documents 718 categorized by document type. For instance, the second set of electronic documents 718 associated with company B 704 may have a first subset of electronic documents 718 with a document type for supply agreements 712, a second subset of electronic documents 718 with a document type for lease agreements 716, and a third subset of electronic documents 718 with a document type for service agreements 714. In one embodiment, the sets and subsets of electronic documents 718 may be identified using labels manually assigned by a human operator, such as metadata added to a document record for a signed electronic document created in a document management system, or feedback from a user of the system 100 during a document generation process. In one embodiment, the sets and subsets of electronic documents 718 may be unlabeled.

FIG. 8 illustrates an example of an electronic document 718. An electronic document 718 may include different information types that collectively form a set of document components 802 for the electronic document 718. The document components 802 may comprise, for example, one or more audio components 804, text components 806, image components 808, or table components 810. Each document component 802 may comprise different content types. For example, the text components 806 may comprise structured text 812, unstructured text 814, or semi-structured text 816.

Structured text 812 refers to text information that is organized in a specific format or schema, such as words, sentences, paragraphs, sections, clauses, and so forth. Structured text 812 has a well-defined set of rules that dictate how the data should be organized and represented, including the data types and relationships between data elements.

Unstructured text 814 refers to text information that does not have a predefined or organized format or schema. Unlike structured text 812, which is organized in a specific way, unstructured text 814 can take various forms, such as text information stored in a table, spreadsheet, figures, equations, header, footer, filename, metadata, and so forth.

Semi-structured text 816 is text information that does not fit neatly into the traditional categories of structured and unstructured data. It has some structure but does not conform to the rigid structure of a specific format or schema. Semi-structured data is characterized by the presence of context tags or metadata that provide some structure and context for the text information, such as a caption or description of a figure, name of a table, labels for equations, and so forth.

Figure 9:
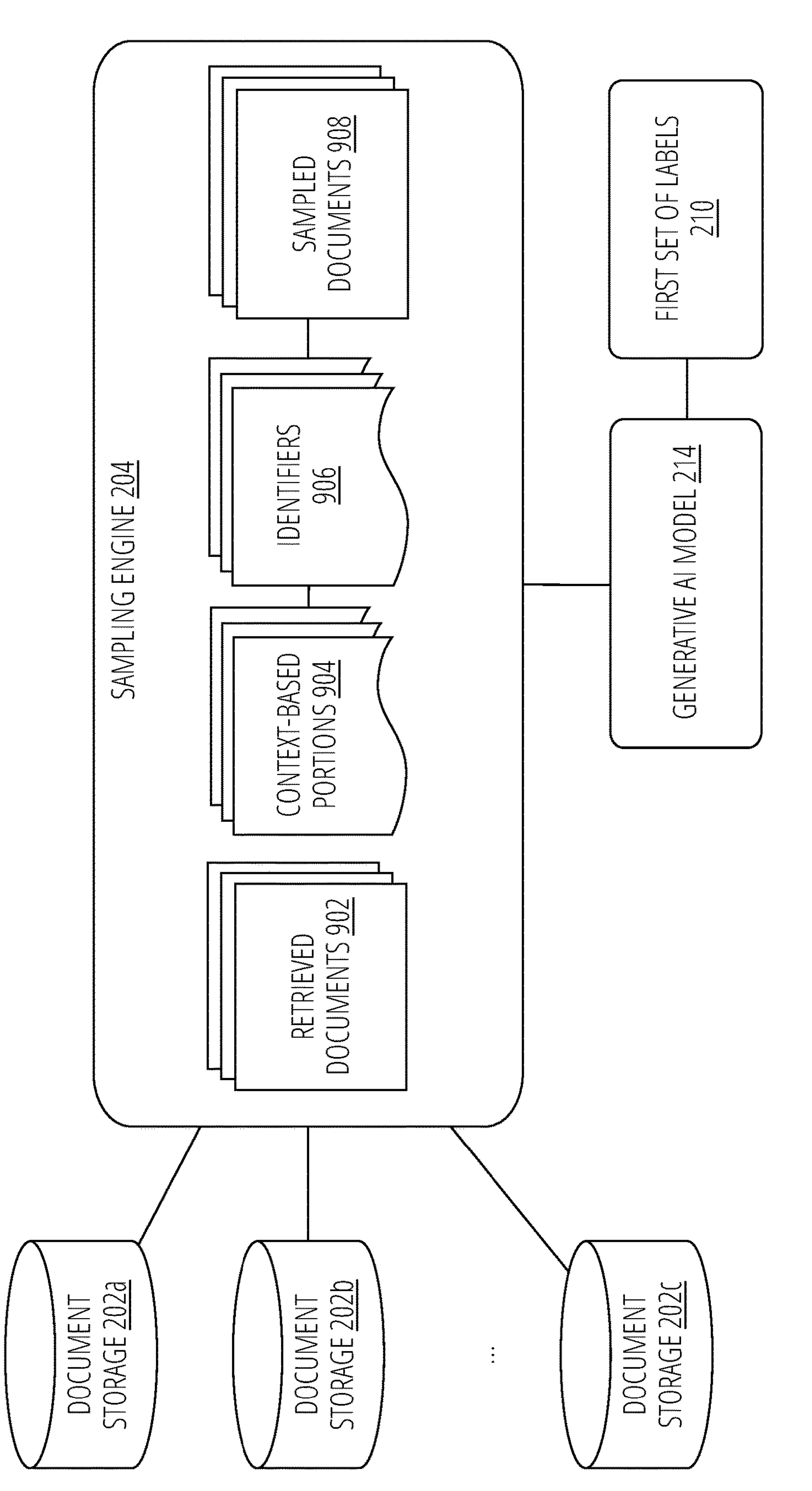
FIG. 9 illustrates an example of a sampling engine, according to some embodiments of the current subject matter.

FIG. 9 illustrates an example of the sampling engine 204, according to some embodiments of the current subject matter. The sampling engine 204 may be any combination hardware and/or hardware. It may be implemented in the model tuning engine 124 and/or as a separate processing engine. The sampling engine 204 may be configured to receive one or more retrieved documents 902. The retrieved documents 902 may be obtained, retrieved, and/or received from one or more data sources 202 (a, b, . . . , c). In some example embodiments, the retrieved documents 902 may be obtained from one or more public databases, government databases, and/or any other data sources. The retrieved documents 902 may be related to a specific query directed to a particular database (e.g., "find all 10 k statements by Company ABC from SEC-EDGAR database"; "find all real-estate sales agreements for purchases of commercial real estate by Company XYZ recorded in the clerk's office in the county of San Francisco"; etc.). Alternatively, or in addition, the retrieved documents 902 may be unrelated to any particular query, task, etc. and may be provided to the sampling engine 204 for the purposes of continuously generating sampled documents 908 so that the latter may be used for generation of first set of labels 210 by the generative AI model 214.

Upon ingesting of the retrieved documents 902, the sampling engine 204 may be configured to analyze the documents 902 to identify one or more context-based portions 904. For example, context may be related to a particular type of electronic document (e.g., sales agreement, lease agreement, etc.), a particular query (e.g., searches of termination provisions, governing law of agreements, etc.), and/or to any other parameter, factor, etc., which may be used for identification of one or more context-based portions 904. The context-based portions 904 may be text, images, graphics, video, audio, social media postings, etc. and/or any combinations thereof.

Once identified, the sampling engine 204 may be configured to assign one or more identifiers 906 to each of the identified context-based portions 904. The identifiers may be any type of alpha-numeric characters, phrases, etc. The identifiers 906 may be used to correlate identified portions 904 of electronic documents with sampled documents 908 generated by the sampling engine 204.

The sampling engine 204 may use the context-based portions 904 to generate one or more sampled documents 908. The sampled documents 908 may represent a subset of the retrieved documents 902. For example, the sampling engine 204 may be configured to receive a large number of electronic documents (e.g., 1000 documents) from the data sources 202. However, in view of a specific contextual query seeking specific electronic documents (e.g., sales agreements for purchase of commercial real estate in California, USA), the sampled documents 908 may be a much smaller subset of the retrieved documents 902 (e.g., 250 documents). The smaller number of sampling engine 204 may be processed more easily, less computationally expensive and not as time-consuming by the generative AI model 214. As can be understood, the sampling engine 204 may be configured to sample retrieved documents 902 in any other way in order to generate sampled documents 908.

Once the sampled documents 908 are generated, the sampling engine 204 may send them to the generative AI model 214. The generative AI model 214 may analyze the sampled documents 908 and generate at least one first set of labels 210. The analysis of the sampled documents 908 may be triggered based on one or more instructions that may be sent to the generative AI model 214 along with the sampled documents 908. For example, the instruction may state "generate labels for lease agreement termination provisions in the sampled documents." Thus, the generated first labels may be representative of the termination provisions in the lease agreements contained in the sampled documents 908. Alternatively, or in addition, the generative AI model 214 may be instructed to generate labels for all or some portions of the sampled documents 908. As can be understood, any type of instructions may be provided to the generative AI model 214 for the purposes of generating first set of labels 210.

Figure 10:
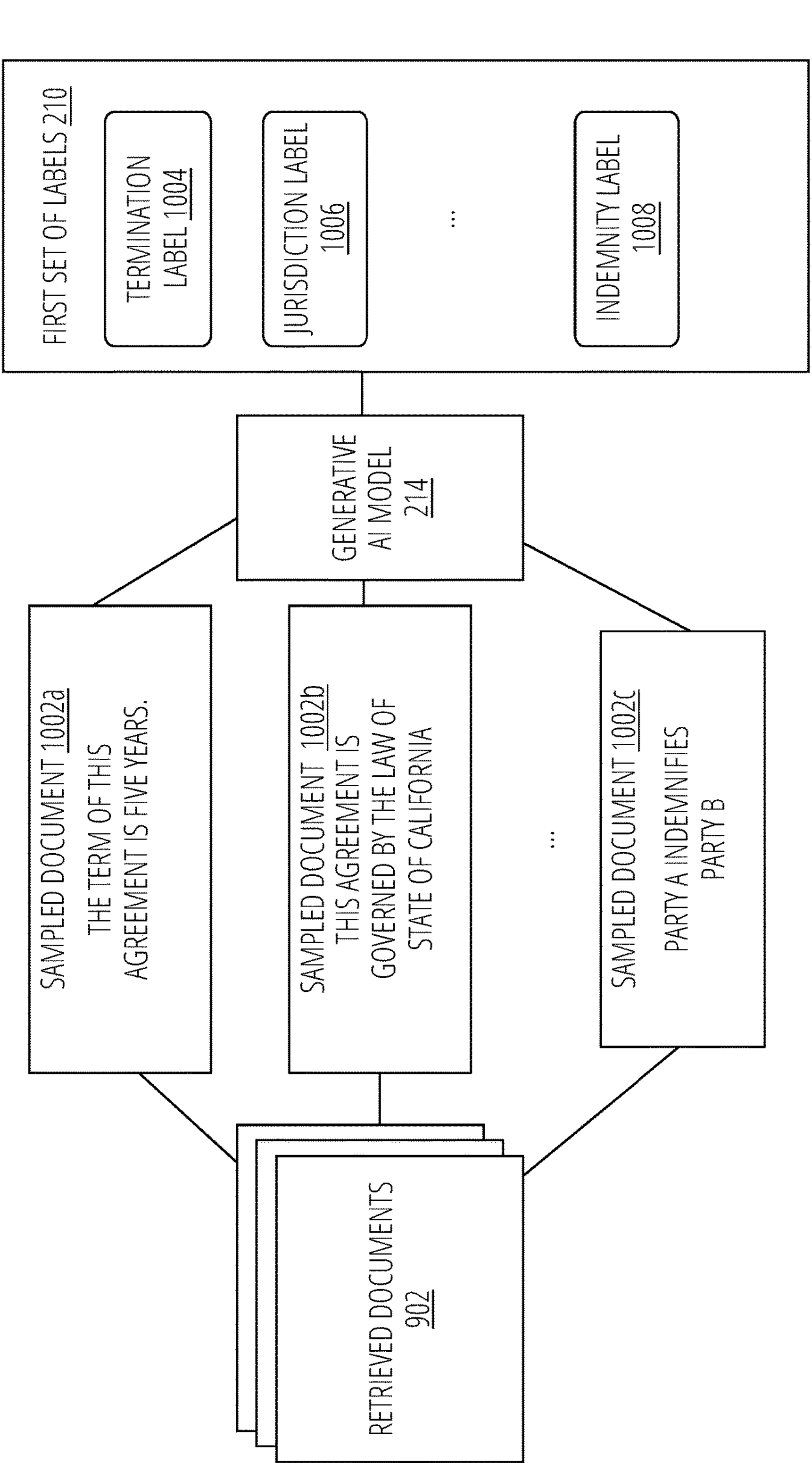
FIG. 10 illustrates an example of an operation of the sampling engine, according to some embodiments of the current subject matter.

FIG. 10 illustrates an example of an operation of the sampling engine 204, according to some embodiments of the current subject matter. As discussed above in connection with FIG. 9, the sampling engine 204 may receive one or more retrieved documents 902. The retrieved documents may be sampled to generate one or more sampled documents 1002*a*, 1002*b*, . . . 1002*c*. For example, sampled document 1002*a* may be sampled based on a provision contained in such document that may indicate that "the term of this agreement is five years." Sampled document 1002*b* may be sampled by the sampling engine 204 based on the governing law of the agreement, i.e., "this agreement is governed by the state of California." The sampling engine 204 may identify sampled document 1002*c* based on the indemnity provision contained in the document, i.e., "party A indemnifies party B."

The sampled documents 1002 (a, b, . . . , c) and/or any of its portions (e.g., termination clause, governing law clause, indemnity clause, etc.) and/or just its portions may be sent by the sampling engine 204 to the generative AI model 214 (with and/or without a separate instruction(s)). Upon processing of the sampled documents 1002, the generative AI model 214 may generate first set of labels 210, e.g., termination label 1004 corresponding to the sampled document 1002*a* and its termination clause, jurisdiction label 1006 corresponding to the sampled document 1002*b* and its governing law clause, indemnity label 1008 corresponding to the sampled document 1002*c* and its indemnity clause, etc. As can be understood, any other way of generating first set of labels 210 by the generative AI model 214 are possible.

Figure 11:
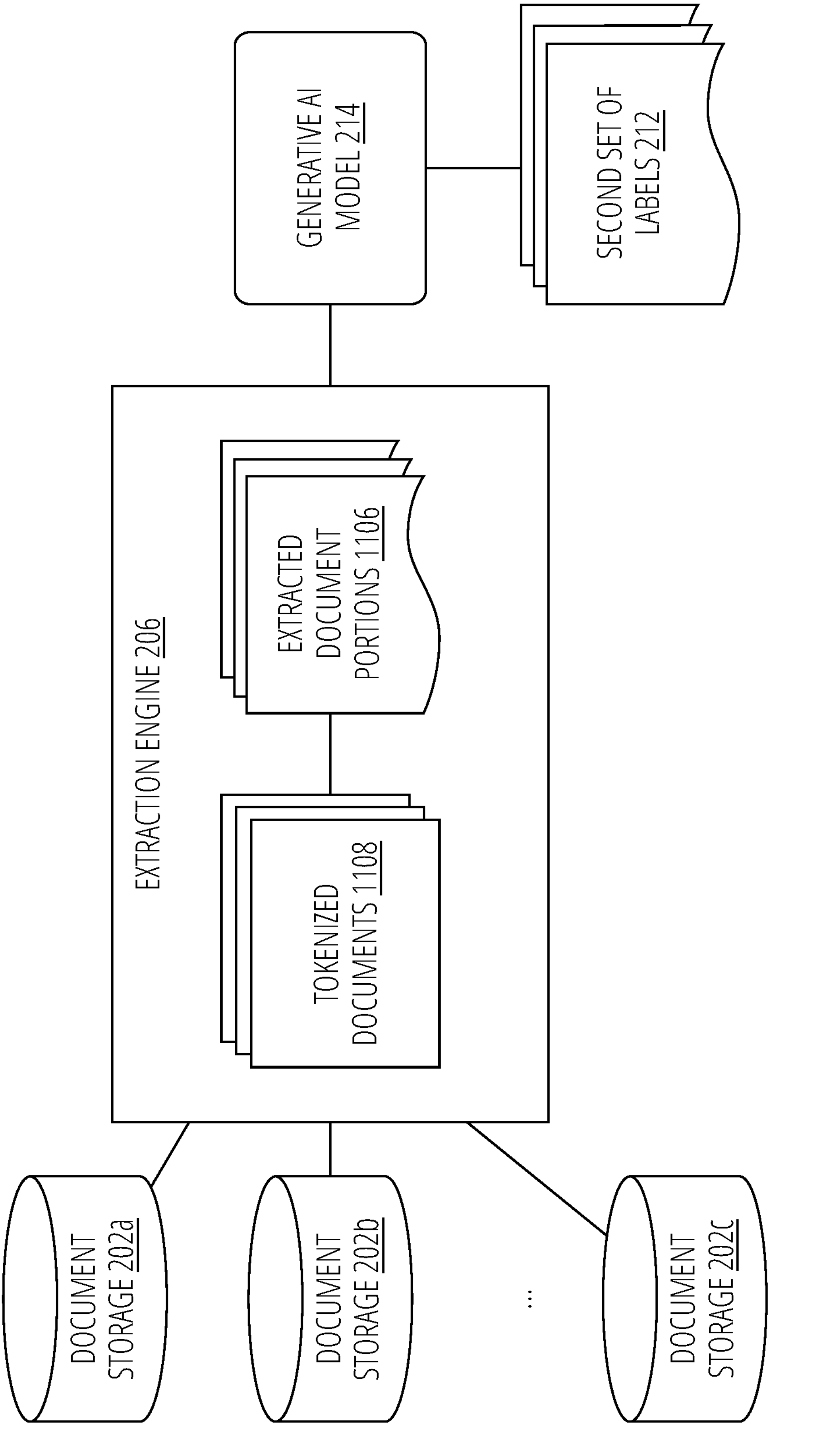
FIG. 11 illustrates an example of an extraction engine, according to some embodiments of the current subject matter.

FIG. 11 illustrates an example of the extraction engine 206, according to some embodiments of the current subject matter. Similar to the sampling engine 204, the extraction engine 206 may be configured to receive, obtain, and/or retrieve electronic document from one or more data sources 202. However, the electronic documents that may be received by the extraction engine 206 may be tokenized documents 1102. Tokenized documents 1102 may be configured to include one or more tokens, identifiers, and/or any other inputs that may identify one or more portions of the electronic documents. For example, in the tokenized documents 1102, one or more portions may be assigned one or more such tokens/identifiers/other inputs identifying one or more portions of the electronic document (e.g., a governing law clause may be identified by a "jurisdiction token", an indemnity clause may be identified by an "indemnity token", a termination clause of a lease agreement may be identified by a "termination" token, etc.).

The extraction engine 206 may use the tokens to extract one or more portions from electronic documents received from one or more data sources 202. In some example embodiments, the data sources 202 (e.g., data source 202*c*) that store tokenized documents may be private databases that might not be generally accessible to public, e.g., internal company databases, secured access databases, etc. Such databases may be configured to process electronic documents, identify specific portions in such documents, assign tokens to such portions, and then store the documents along with the tokens. For example, a "termination" token may be assigned to termination clauses in the documents, an "indemnity" token may be assigned to indemnity clauses in the documents, etc. The extraction engine 206, using such tokens, may extract extracted document portions 1106 from the retrieved electronic documents.

The extraction engine 206 may then send the extracted document portions 1106 to the generative AI model 214 for processing. The generative AI model 214 may analyze the portions 1106 and generate the second set of labels 212. Again, the generative AI model 214 may be provided with one or more instructions related to generation of the second set of labels 212 based on the received extracted document portions 1106. Alternatively, or in addition, the generative AI model 214 may generate second set of labels 212 without any specific instructions. The generative AI model 214 that processes inputs from the sampling engine 204 and from the extraction engine 206 may be the same and/or different.

Once the generative AI model 214 has generated the second set of labels 212, the labels 212 may be returned to the model tuning engine 124. The first set of labels 210 and the second set of labels 212 may then be used for training one or more large language models, e.g., models 216 (not shown in FIG. 11). In some example embodiments, one or more models 216 may be selected for training using labels 210 and/or 212.

Figure 12:
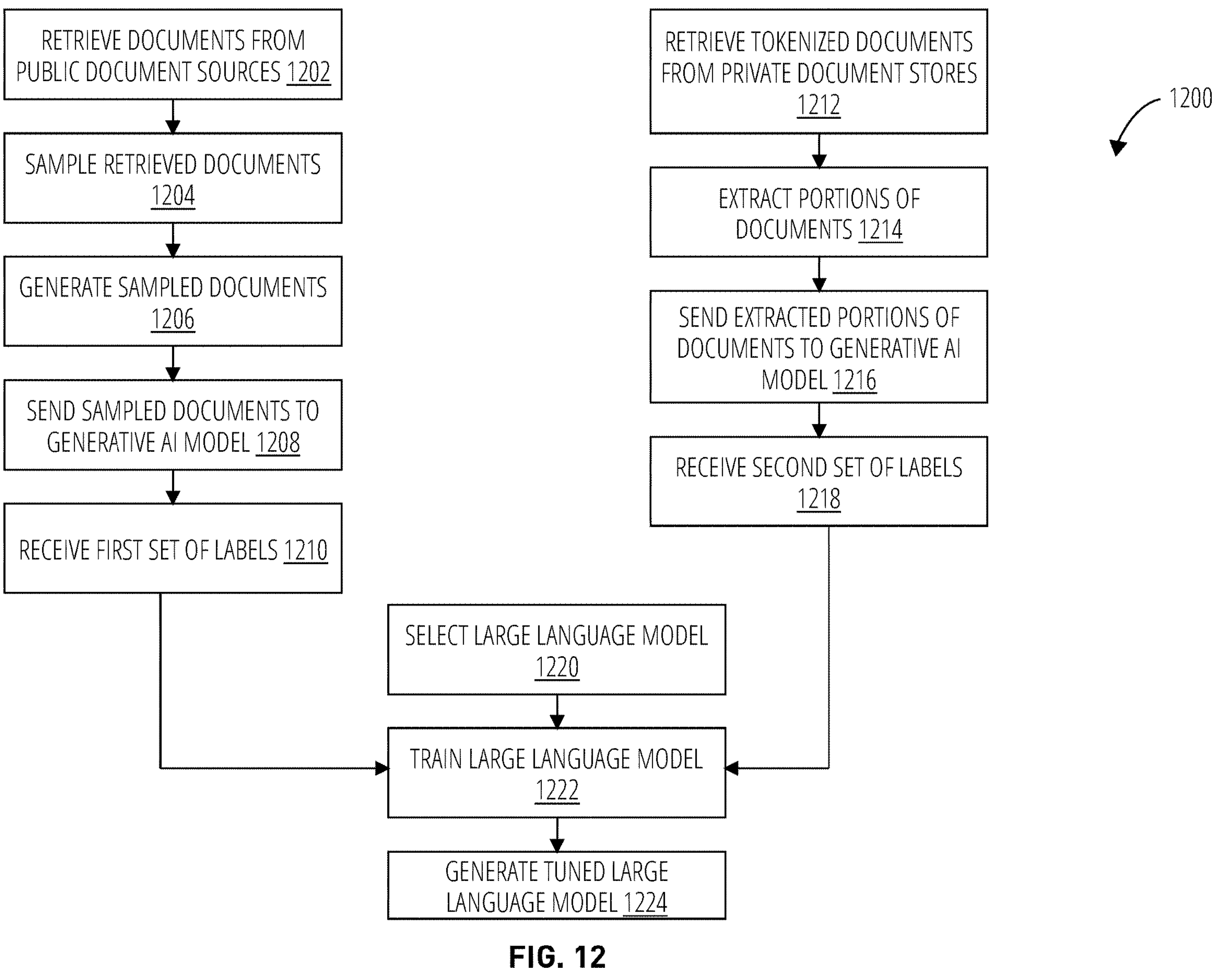
FIG. 12 illustrates an example process that may be executed by the model tuning engine, according to some embodiments of the current subject matter.

FIG. 12 illustrates an example process 1200 that may be executed by the model tuning engine 124, according to some embodiments of the current subject matter. In the process 1200, one or more operations 1202-1210 may be executed by the sampling engine 204, one or more operations 1212-1218 may be executed by the extraction engine 206, and operations 1220-1224 may be executed by the model training engine 208 shown in FIG. 2. Operations 1202-1210 and operations 1212-1218 may be executed simultaneously (or substantially simultaneously) and/or one after the other. Moreover, operations 1220-1224 may be executed as soon as output of one or more sets of operations 1202-1210 and/or 1212-1218 is received and/or upon all operations 1202-1218 are completed, and/or in any other manner.

At 1202, one or more electronic documents may be retrieved from one or more data sources 202*a* and/or 202*b* and provided to the sampling engine 204, where such data sources may be public databases, government databases, etc. The retrieved documents (e.g., retrieved documents 902) may be any type of documents (e.g., agreements, official filings (e.g., 10*k* statements), and/or any other documents), and may be stored by the sources 202*a*, 202*b* in any desired fashion. Such documents may or may not be searchable, and/or any of its portions may or may not be identifiable.

At 1204, the sampling engine 204 may sample the retrieved documents 902 to generate sampled documents 908, at 1206. Sampling may be configured to reduce the number of documents for further processing. Sampling may be based on specific context (e.g., termination clauses, jurisdictional law clauses, etc.), type of documents (e.g., lease agreements, official filings, etc.), and/or any other factors.

At 1208, the sampling engine 204 may be configured to send the sampled documents 908 to the generative AI model 214 for processing. The sampling engine 204 may request that the generative AI model 214 generate one or more labels (e.g., first set of labels 210) for the sampled documents 908.

At 1210, the sampling engine 204 may receive the first set of labels 210 from the generative AI model 214. The labels in the first set of labels 210 may be used to identify specific portions within the sampled documents 908. The labels may be in any desired format.

At 1212, the extraction engine 206 may be configured to receive one or more electronic documents from data sources 202 (e.g., data source 202*c*). The electronic documents that the extraction engine 206 may receive may be tokenized (e.g., tokenized documents 1102, as shown in FIG. 11).

Using the tokens contained in the tokenized documents 1102, the extraction engine 206 may be configured to extract one or more portions from the documents, at 1214, and send extracted portions to the generative AI model 214, at 1216. The generative AI model 214 may analyze the extracted portions and generate one or more labels (e.g., second set of labels 212). Th extraction engine 206, similar to the sampling engine 204, may provide instructions to the generative AI model 214 to generate the second set of labels 212. Alternatively, or in addition, no instructions may be provided to the generative AI model 214 for generation of the second set of labels 212. The extraction engine 206 may receive the second set of labels 212 from the generative AI model 214, at 1218.

At 1220, the model training engine 208 may be configured to identify and/or select one or more large language models, e.g., models 216, for training. The models 216 may be any type of large language models, e.g., models that may be specifically designed to analyze legal documents (e.g., agreements, court and/or any other legal filings, etc.), and/or any other type of models. The models 216 may be selected upon receiving an instruction to select a specific model and/or without an instruction. Multiple models 216 may be selected for training by the model training engine 208 simultaneously and/or substantially simultaneously.

Once the model(s) 216 are selected, the model training engine 208 may be configured to receive the first set of labels 210 from the sampling engine 204 and the second set of labels 212 from the extraction engine 206, at 1222. Using the received labels, the model training engine 208 may then train the selected model(s) 216, at 1222, and upon completion of training, generate a tuned large language model, at 1224. The training of selected models may be continuous (e.g., based on continuous receipt of one or more of first set of labels 210 and second set of labels 212, based on user feedback, etc.), and/or may be one-time. The models may be re-trained, refresh trained, etc. The trained models may then be used to analyze documents.

FIG. 13 illustrates an example process 1300 for generating a tuned large language model, according to some embodiments of the current subject matter. The process 1300 may be executed by the system 100 shown in FIG. 1, and in particular, the model tuning engine 124 shown in FIG. 2.

At 1302, the model tuning engine 124 (e.g., its sampling engine 204) may sample one or more first electronic documents (e.g., as retrieved from data sources 202*a* and/or 202*b*, which may be public databases, government databases, etc.). Sampling of the retrieved electronic documents may be configured to generate one or more sampled electronic documents (e.g., sampled documents 908) for the purposes of generating one or more first labels (e.g., first set of labels 210).

At 1304, the model tuning engine 124 (e.g., its extraction engine 206) may identify one or more portions of one or more second electronic documents (e.g., as retrieved from data source 202*c*, which may be private databases). The extraction engine 206 may then extract one or more portions (e.g., extracted document portions 1106) from one or more second electronic documents for the purposes of generating one or more second labels (e.g., second set of labels 212).

At 1306, the model tuning engine 124 may send the sampled electronic documents (e.g., sampled documents 908) to a generative artificial intelligence (AI) model (e.g., generative AI model 214) to generate one or more first labels (e.g., first set of labels 210) for the sampled electronic documents. It may also send the portions (e.g., extracted document portions 1106) of the second electronic documents to the generative AI model (e.g., generative AI model 214) to generate one or more second labels (e.g., second set of labels 212).

At 1308, the model tuning engine 124 may train a large language model (e.g., one or more of models 216) using the first labels and the second labels, in order to generate a trained large language model (e.g., tuned model 218).

Figure 14:
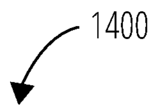
FIG. 14 illustrates an example of a process for generation of sampled electronic documents that may be executed by the sampling engine of the model tuning engine, according to some embodiments of the current subject matter.

FIG. 14 illustrates an example of a process 1400 for generation of sampled electronic documents (e.g., sampled documents 908) that may be executed by the sampling engine 204 of the model tuning engine 124, according to some embodiments of the current subject matter. At 1402, the sampling engine 204 may be configured to identify one or more context-based portions (e.g., context-based portions 904) of the first electronic documents, which may be retrieved from the data sources 202*a* and/or 202*b*. The context-based portions 904 may relate to specific subject matter that may be contained within the electronic document (e.g., termination clauses of a sales agreement, governing law of a lease agreement, etc.).

At 1404, the sampling engine 204 may assign one or more identifiers to one or more context-based portions 904. The identifiers (e.g., identifiers 906) may be any type of identifiers, such as, alpha-numeric characters, phrases, etc. The identifiers 906 may be used to identify particular portions within the sampled documents 908. At 1406, the sampling engine 204 may be configured to generate a set of sampled documents using the identifiers 906 that have been assigned by the sampling engine 204.

FIG. 15 illustrates another example process 1500 for generating a tuned large language model, according to some embodiments of the current subject matter. The process 1500 may also be executed by the model tuning engine 124 shown in FIG. 2.

At 1502, the model tuning engine 124 may retrieve one or more first electronic documents (e.g., retrieved documents 902) from a plurality of electronic data sources (e.g., data source 202*a* and/or 202*b*) and generate one or more sampled electronic documents based on the first electronic documents, at 1504. As stated above, the set of sampled documents (e.g., sampled documents 908) may be smaller than the documents that have been retrieved from data sources 202.

At 1506, the model tuning engine 124 may extract one or more portions (e.g., extracted document portions 1106) from one or more second electronic documents, which may have been received from a data source 202*c*, for example.

At 1508, the model tuning engine 124 may send the sampled electronic documents and the portions of the second documents to one or more generative artificial intelligence (AI) models (e.g., models 216) to generate one or more first labels (e.g., first set of labels 210) for the sampled electronic documents, and one or more second labels (e.g., second set of labels 212) for the portions of second documents. At 1510, the model tuning engine 124 may train a large language model, which may be identified and/or selected by the model tuning engine 124, using one or more of the first and second labels to generate a trained large language model, at 1510.

FIG. 16 illustrates yet another example process 1600 for generating a tuned large language model, according to some embodiments of the current subject matter. The process 1600 may likewise be executed by the model tuning engine 124 shown in FIG. 2.

At 1602, the model tuning engine 124 may be configured to train a large language model using one or more labels. The labels include at least one of: one or more first labels (e.g., first set of labels 210) and one or more second labels (e.g., second set of labels 212). The first labels may be generated based on one or more first electronic documents. The second labels may be generated based on one or more portions extracted from one or more second electronic documents. At 1604, the model tuning engine 124 may generate a trained large language model.

Figure 17:
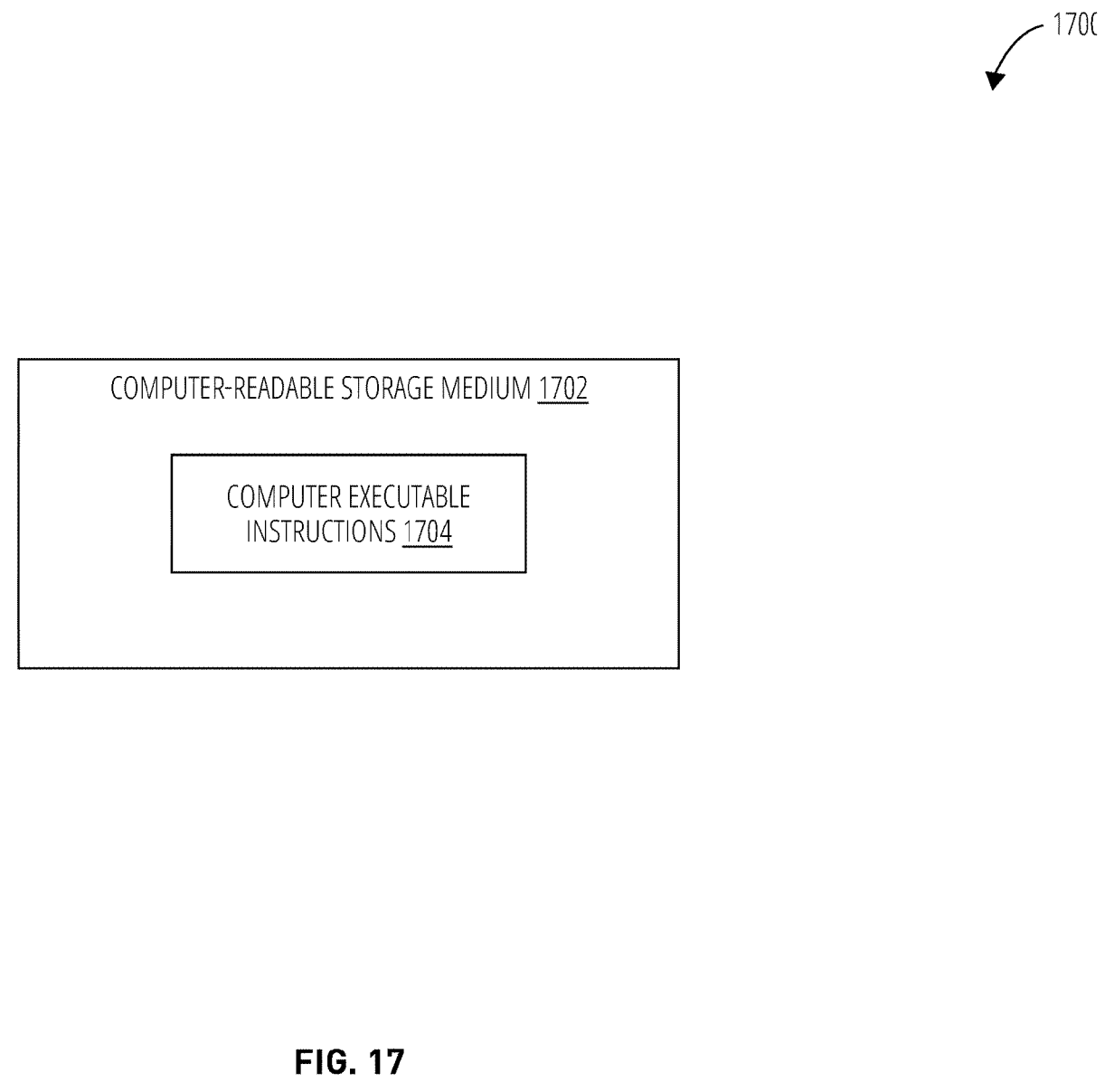

FIG. 17 illustrates an apparatus 1700. Apparatus 1700 may comprise any non-transitory computer-readable storage medium 1702 or machine-readable storage medium, such as an optical, magnetic or semiconductor storage medium. In various embodiments, apparatus 1700 may comprise an article of manufacture or a product. In some embodiments, the computer-readable storage medium 1702 may store computer executable instructions with which circuitry can execute. For example, computer executable instructions 1704 can include instructions to implement operations described with respect to any logic flows described herein. Examples of computer-readable storage medium 1702 or machine-readable storage medium may include any tangible media capable of storing electronic data, including volatile memory or non-volatile memory, removable or non-removable memory, erasable or non-erasable memory, writeable or re-writeable memory, and so forth. Examples of computer executable instructions 1704 may include any suitable type of code, such as source code, compiled code, interpreted code, executable code, static code, dynamic code, object-oriented code, visual code, and the like.

FIG. 18 illustrates an embodiment of a computing architecture 1800. Computing architecture 1800 is a computer system with multiple processor cores such as a distributed computing system, supercomputer, high-performance computing system, computing cluster, mainframe computer, mini-computer, client-server system, personal computer (PC), workstation, server, portable computer, laptop computer, tablet computer, handheld device such as a personal digital assistant (PDA), or other device for processing, displaying, or transmitting information. Similar embodiments may comprise, e.g., entertainment devices such as a portable music player or a portable video player, a smart phone or other cellular phone, a telephone, a digital video camera, a digital still camera, an external storage device, or the like. Further embodiments implement larger scale server configurations. In other embodiments, the computing architecture 1800 may have a single processor with one core or more than one processor. Note that the term "processor" refers to a processor with a single core or a processor package with multiple processor cores. In at least one embodiment, the computing architecture 1800 is representative of the components of the system 100. More generally, the computing architecture 1800 is configured to implement all logic, systems, logic flows, methods, apparatuses, and functionality described herein with reference to previous figures.

As used in this application, the terms "system" and "component" and "module" are intended to refer to a computer-related entity, either hardware, a combination of hardware and software, software, or software in execution, examples of which are provided by the exemplary computing architecture 1800. For example, a component can be, but is not limited to being, a process running on a processor, a processor, a hard disk drive, multiple storage drives (of optical and/or magnetic storage medium), an object, an executable, a thread of execution, a program, and/or a computer. By way of illustration, both an application running on a server and the server can be a component. One or more components can reside within a process and/or thread of execution, and a component can be localized on one computer and/or distributed between two or more computers. Further, components may be communicatively coupled to each other by various types of communications media to coordinate operations. The coordination may involve the uni-directional or bi-directional exchange of information. For instance, the components may communicate information in the form of signals communicated over the communications media. The information can be implemented as signals allocated to various signal lines. In such allocations, each message is a signal. Further embodiments, however, may alternatively employ data messages. Such data messages may be sent across various connections. Exemplary connections include parallel interfaces, serial interfaces, and bus interfaces.

As shown in FIG. 18, computing architecture 1800 comprises a system-on-chip (SoC) 1802 for mounting platform components. System-on-chip (SoC) 1802 is a point-to-point (P2P) interconnect platform that includes a first processor 1804 and a second processor 1806 coupled via a point-to-point interconnect 1870 such as an Ultra Path Interconnect (UPI). In other embodiments, the computing architecture 1800 may be of another bus architecture, such as a multi-drop bus. Furthermore, each of processor 1804 and processor 1806 may be processor packages with multiple processor cores including core(s) 1808 and core(s) 1810, respectively. While the computing architecture 1800 is an example of a two-socket (2S) platform, other embodiments may include more than two sockets or one socket. For example, some embodiments may include a four-socket (4S) platform or an eight-socket (8S) platform. Each socket is a mount for a processor and may have a socket identifier. Note that the term platform may refers to a motherboard with certain components mounted such as the processor 1804 and chipset 1832. Some platforms may include additional components and some platforms may only include sockets to mount the processors and/or the chipset. Furthermore, some platforms may not have sockets (e.g., SoC, or the like). Although depicted as a SoC 1802, one or more of the components of the SoC 1802 may also be included in a single die package, a multi-chip module (MCM), a multi-die package, a chiplet, a bridge, and/or an interposer. Therefore, embodiments are not limited to a SoC.

The processor 1804 and processor 1806 can be any of various commercially available processors, including without limitation an Intel® Celeron®, Core®, Core (2) Duo®, Itanium®, Pentium®, Xeon®, and XScale® processors; AMD® Athlon®, Duron® and Opteron® processors; ARM® application, embedded and secure processors; IBM® and Motorola® DragonBall® and PowerPC® processors; IBM and Sony® Cell processors; and similar processors. Dual microprocessors, multi-core processors, and other multi-processor architectures may also be employed as the processor 1804 and/or processor 1806. Additionally, the processor 1804 need not be identical to processor 1806.

Processor 1804 includes an integrated memory controller (IMC) 1820 and point-to-point (P2P) interface 1824 and P2P interface 1828. Similarly, the processor 1806 includes an IMC 1822 as well as P2P interface 1826 and P2P interface 1830. IMC 1820 and IMC 1822 couple the processor 1804 and processor 1806, respectively, to respective memories (e.g., memory 1816 and memory 1818). Memory 1816 and memory 1818 may be portions of the main memory (e.g., a dynamic random-access memory (DRAM)) for the platform such as double data rate type 4 (DDR4) or type 5 (DDR5) synchronous DRAM (SDRAM). In the present embodiment, the memory 1816 and the memory 1818 locally attach to the respective processors (i.e., processor 1804 and processor 1806). In other embodiments, the main memory may couple with the processors via a bus and shared memory hub. Processor 1804 includes registers 1812 and processor 1806 includes registers 1814.

Computing architecture 1800 includes chipset 1832 coupled to processor 1804 and processor 1806. Furthermore, chipset 1832 can be coupled to storage device 1850, for example, via an interface (I/F) 1838. The I/F 1838 may be, for example, a Peripheral Component Interconnect-enhanced (PCIe) interface, a Compute Express Link® (CXL) interface, or a Universal Chiplet Interconnect Express (UCIe) interface. Storage device 1850 can store instructions executable by circuitry of computing architecture 1800 (e.g., processor 1804, processor 1806, GPU 1848, accelerator 1854, vision processing unit 1856, or the like). For example, storage device 1850 can store instructions for server device 102, client devices 112, client devices 116, or the like.

Processor 1804 couples to the chipset 1832 via P2P interface 1828 and P2P 1834 while processor 1806 couples to the chipset 1832 via P2P interface 1830 and P2P 1836. Direct media interface (DMI) 1876 and DMI 1878 may couple the P2P interface 1828 and the P2P 1834 and the P2P interface 1830 and P2P 1836, respectively. DMI 1876 and DMI 1878 may be a high-speed interconnect that facilitates, e.g., eight Giga Transfers per second (GT/s) such as DMI 3.0. In other embodiments, the processor 1804 and processor 1806 may interconnect via a bus.

The chipset 1832 may comprise a controller hub such as a platform controller hub (PCH). The chipset 1832 may include a system clock to perform clocking functions and include interfaces for an I/O bus such as a universal serial bus (USB), peripheral component interconnects (PCIs), CXL interconnects, UCIe interconnects, interface serial peripheral interconnects (SPIs), integrated interconnects (I2Cs), and the like, to facilitate connection of peripheral devices on the platform. In other embodiments, the chipset 1832 may comprise more than one controller hub such as a chipset with a memory controller hub, a graphics controller hub, and an input/output (I/O) controller hub.

In the depicted example, chipset 1832 couples with a trusted platform module (TPM) 1844 and UEFI, BIOS, FLASH circuitry 1846 via I/F 1842. The TPM 1844 is a dedicated microcontroller designed to secure hardware by integrating cryptographic keys into devices. The UEFI, BIOS, FLASH circuitry 1846 may provide pre-boot code. The I/F 1842 may also be coupled to a network interface circuit (NIC) 1880 for connections off-chip.

Furthermore, chipset 1832 includes the I/F 1838 to couple chipset 1832 with a high-performance graphics engine, such as, graphics processing circuitry or a graphics processing unit (GPU) 1848. In other embodiments, the computing architecture 1800 may include a flexible display interface (FDI) (not shown) between the processor 1804 and/or the processor 1806 and the chipset 1832. The FDI interconnects a graphics processor core in one or more of processor 1804 and/or processor 1806 with the chipset 1832.

The computing architecture 1800 is operable to communicate with wired and wireless devices or entities via the network interface (NIC) 180 using the IEEE 802 family of standards, such as wireless devices operatively disposed in wireless communication (e.g., IEEE 802.11 over-the-air modulation techniques). This includes at least Wi-Fi (or Wireless Fidelity), WiMax, and Bluetooth™ wireless technologies, 3G, 4G, LTE wireless technologies, among others. Thus, the communication can be a predefined structure as with a conventional network or simply an ad hoc communication between at least two devices. Wi-Fi networks use radio technologies called IEEE 802.11x (a, b, g, n, ac, ax, etc.) to provide secure, reliable, fast wireless connectivity. A Wi-Fi network can be used to connect computers to each other, to the Internet, and to wired networks (which use IEEE 802.3-related media and functions).

Additionally, accelerator 1854 and/or vision processing unit 1856 can be coupled to chipset 1832 via I/F 1838. The accelerator 1854 is representative of any type of accelerator device (e.g., a data streaming accelerator, cryptographic accelerator, cryptographic co-processor, an offload engine, etc.). One example of an accelerator 1854 is the Intel® Data Streaming Accelerator (DSA). The accelerator 1854 may be a device including circuitry to accelerate copy operations, data encryption, hash value computation, data comparison operations (including comparison of data in memory 1816 and/or memory 1818), and/or data compression. For example, the accelerator 1854 may be a USB device, PCI device, PCIe device, CXL device, UCIe device, and/or an SPI device. The accelerator 1854 can also include circuitry arranged to execute machine learning (ML) related operations (e.g., training, inference, etc.) for ML models. Generally, the accelerator 1854 may be specially designed to perform computationally intensive operations, such as hash value computations, comparison operations, cryptographic operations, and/or compression operations, in a manner that is more efficient than when performed by the processor 1804 or processor 1806. Because the load of the computing architecture 1800 may include hash value computations, comparison operations, cryptographic operations, and/or compression operations, the accelerator 1854 can greatly increase performance of the computing architecture 1800 for these operations.

The accelerator 1854 may include one or more dedicated work queues and one or more shared work queues (each not pictured). Generally, a shared work queue is configured to store descriptors submitted by multiple software entities. The software may be any type of executable code, such as a process, a thread, an application, a virtual machine, a container, a microservice, etc., that share the accelerator 1854. For example, the accelerator 1854 may be shared according to the Single Root I/O virtualization (SR-IOV) architecture and/or the Scalable I/O virtualization (S-IOV) architecture. Embodiments are not limited in these contexts. In some embodiments, software uses an instruction to atomically submit the descriptor to the accelerator 1854 via a non-posted write (e.g., a deferred memory write (DMWr)). One example of an instruction that atomically submits a work descriptor to the shared work queue of the accelerator 1854 is the ENQCMD command or instruction (which may be referred to as "ENQCMD" herein) supported by the Intel® Instruction Set Architecture (ISA). However, any instruction having a descriptor that includes indications of the operation to be performed, a source virtual address for the descriptor, a destination virtual address for a device-specific register of the shared work queue, virtual addresses of parameters, a virtual address of a completion record, and an identifier of an address space of the submitting process is representative of an instruction that atomically submits a work descriptor to the shared work queue of the accelerator 1854. The dedicated work queue may accept job submissions via commands such as the movdir64b instruction.

Various I/O devices 1860 and display 1852 couple to the bus 1872, along with a bus bridge 1858 which couples the bus 1872 to a second bus 1874 and an I/F 1840 that connects the bus 1872 with the chipset 1832. In one embodiment, the second bus 1874 may be a low pin count (LPC) bus. Various devices may couple to the second bus 1874 including, for example, a keyboard 1862, a mouse 1864 and communication devices 1866.

Furthermore, an audio I/O 1868 may couple to second bus 1874. Many of the I/O devices 1860 and communication devices 1866 may reside on the system-on-chip (SoC) 1802 while the keyboard 1862 and the mouse 1864 may be add-on peripherals. In other embodiments, some or all the I/O devices 1860 and communication devices 1866 are add-on peripherals and do not reside on the system-on-chip (SoC) 1802.

FIG. 19 illustrates a block diagram of an exemplary communications architecture 1900 suitable for implementing various embodiments as previously described. The communications architecture 1900 includes various common communications elements, such as a transmitter, receiver, transceiver, radio, network interface, baseband processor, antenna, amplifiers, filters, power supplies, and so forth. The embodiments, however, are not limited to implementation by the communications architecture 1900.

As shown in FIG. 19, the communications architecture 1900 includes one or more clients 1902 and servers 1904. The clients 1902 may implement a client version of the server device 102, for example. The servers 1904 may implement a server version of the server device 102, for example. The clients 1902 and the servers 1904 are operatively connected to one or more respective client data stores 1908 and server data stores 1910 that can be employed to store information local to the respective clients 1902 and servers 1904, such as cookies and/or associated contextual information.

The clients 1902 and the servers 1904 may communicate information between each other using a communication framework 1906. The communications communication framework 1906 may implement any well-known communications techniques and protocols. The communications communication framework 1906 may be implemented as a packet-switched network (e.g., public networks such as the Internet, private networks such as an enterprise intranet, and so forth), a circuit-switched network (e.g., the public switched telephone network), or a combination of a packet-switched network and a circuit-switched network (with suitable gateways and translators).

The communication framework 1906 may implement various network interfaces arranged to accept, communicate, and connect to a communications network. A network interface may be regarded as a specialized form of an input output interface. Network interfaces may employ connection protocols including without limitation direct connect, Ethernet (e.g., thick, thin, twisted pair 10/100/1000 Base T, and the like), token ring, wireless network interfaces, cellular network interfaces, IEEE 802.11 network interfaces, IEEE 802.16 network interfaces, IEEE 802.20 network interfaces, and the like. Further, multiple network interfaces may be used to engage with various communications network types. For example, multiple network interfaces may be employed to allow for the communication over broadcast, multicast, and unicast networks. Should processing requirements dictate a greater amount speed and capacity, distributed network controller architectures may similarly be employed to pool, load balance, and otherwise increase the communicative bandwidth required by clients 1902 and the servers 1904. A communications network may be any one and the combination of wired and/or wireless networks including without limitation a direct interconnection, a secured custom connection, a private network (e.g., an enterprise intranet), a public network (e.g., the Internet), a Personal Area Network (PAN), a Local Area Network (LAN), a Metropolitan Area Network (MAN), an Operating Missions as Nodes on the Internet (OMNI), a Wide Area Network (WAN), a wireless network, a cellular network, and other communications networks.

The components and features of the devices described above may be implemented using any combination of discrete circuitry, application specific integrated circuits (ASICs), logic gates and/or single chip architectures. Further, the features of the devices may be implemented using microcontrollers, programmable logic arrays and/or microprocessors or any combination of the foregoing where suitably appropriate. It is noted that hardware, firmware and/or software elements may be collectively or individually referred to herein as "logic" or "circuit."

It will be appreciated that the exemplary devices shown in the block diagrams described above may represent one functionally descriptive example of many potential embodiments. Accordingly, division, omission or inclusion of block functions depicted in the accompanying figures does not infer that the hardware components, circuits, software and/or elements for implementing these functions would necessarily be divided, omitted, or included in embodiments.

At least one computer-readable storage medium may include instructions that, when executed, cause a system to perform any of the computer-implemented methods described herein.

Some embodiments may be described using the expression "one embodiment" or "an embodiment" along with their derivatives. These terms mean that a particular feature, structure, or characteristic described in connection with the embodiment is included in at least one embodiment. The appearances of the phrase "in one embodiment" in various places in the specification are not necessarily all referring to the same embodiment. Moreover, unless otherwise noted the features described above are recognized to be usable together in any combination. Thus, any features discussed separately may be employed in combination with each other unless it is noted that the features are incompatible with each other.

With general reference to notations and nomenclature used herein, the detailed descriptions herein may be presented in terms of program procedures executed on a computer or network of computers. These procedural descriptions and representations are used by those skilled in the art to most effectively convey the substance of their work to others skilled in the art.

A procedure is here, and generally, conceived to be a self-consistent sequence of operations leading to a desired result. These operations are those requiring physical manipulations of physical quantities. Usually, though not necessarily, these quantities take the form of electrical, magnetic or optical signals capable of being stored, transferred, combined, compared, and otherwise manipulated. It proves convenient at times, principally for reasons of common usage, to refer to these signals as bits, values, elements, symbols, characters, terms, numbers, or the like. It should be noted, however, that all of these and similar terms are to be associated with the appropriate physical quantities and are merely convenient labels applied to those quantities.

Further, the manipulations performed are often referred to in terms, such as adding or comparing, which are commonly associated with mental operations performed by a human operator. No such capability of a human operator is necessary, or desirable in most cases, in any of the operations described herein, which form part of one or more embodiments. Rather, the operations are machine operations. Useful machines for performing operations of various embodiments include general purpose digital computers or similar devices.

Some embodiments may be described using the expression "coupled" and "connected" along with their derivatives. These terms are not necessarily intended as synonyms for each other. For example, some embodiments may be described using the terms "connected" and/or "coupled" to indicate that two or more elements are in direct physical or electrical contact with each other. The term "coupled," however, may also mean that two or more elements are not in direct contact with each other, but yet still co-operate or interact with each other.

Various embodiments also relate to apparatus or systems for performing these operations. This apparatus may be specially constructed for the required purpose, or it may comprise a general-purpose computer as selectively activated or reconfigured by a computer program stored in the computer. The procedures presented herein are not inherently related to a particular computer or other apparatus. Various general-purpose machines may be used with programs written in accordance with the teachings herein, or it may prove convenient to construct more specialized apparatus to perform the required method steps. The required structure for a variety of these machines will appear from the description given.

What has been described above includes examples of the disclosed architecture. It is, of course, not possible to describe every conceivable combination of components and/or methodologies, but one of ordinary skill in the art may recognize that many further combinations and permutations are possible. Accordingly, the novel architecture is intended to embrace all such alterations, modifications and variations that fall within the spirit and scope of the appended claims.

The various elements of the devices as previously described with reference to FIGS. 1-19 may include various hardware elements, software elements, or a combination of both. Examples of hardware elements may include devices, logic devices, components, processors, microprocessors, circuits, processors, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), memory units, logic gates, registers, semiconductor device, chips, microchips, chip sets, and so forth. Examples of software elements may include software components, programs, applications, computer programs, application programs, system programs, software development programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. However, determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given implementation.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores," may be stored on a tangible, machine readable medium and supplied to various customers or manufacturing facilities to load into the fabrication machines that make the logic or processor. Some embodiments may be implemented, for example, using a machine-readable medium or article which may store an instruction or a set of instructions that, if executed by a machine, may cause the machine to perform a method and/or operations in accordance with the embodiments. Such a machine may include, for example, any suitable processing platform, computing platform, computing device, processing device, computing system, processing system, computer, processor, or the like, and may be implemented using any suitable combination of hardware and/or software. The machine-readable medium or article may include, for example, any suitable type of memory unit, memory device, memory article, memory medium, storage device, storage article, storage medium and/or storage unit, for example, memory, removable or non-removable media, erasable or non-erasable media, writeable or re-writeable media, digital or analog media, hard disk, floppy disk, Compact Disk Read Only Memory (CD-ROM), Compact Disk Recordable (CD-R), Compact Disk Rewriteable (CD-RW), optical disk, magnetic media, magneto-optical media, removable memory cards or disks, various types of Digital Versatile Disk (DVD), a tape, a cassette, or the like. The instructions may include any suitable type of code, such as source code, compiled code, interpreted code, executable code, static code, dynamic code, encrypted code, and the like, implemented using any suitable high-level, low-level, object-oriented, visual, compiled and/or interpreted programming language.

It will be appreciated that the exemplary devices shown in the block diagrams described above may represent one functionally descriptive example of many potential embodiments. Accordingly, division, omission or inclusion of block functions depicted in the accompanying figures does not infer that the hardware components, circuits, software and/or elements for implementing these functions would necessarily be divided, omitted, or included in embodiments.

The following examples pertain to further embodiments, from which numerous permutations and configurations will be apparent.

In one aspect, a method, includes sampling, using at least one processor, one or more first electronic documents to generate one or more sampled electronic documents; identifying, using the at least one processor, one or more portions of one or more second electronic documents, and extracting the one or more portions from the one or more second electronic documents; sending, using the at least one processor, the one or more sampled electronic documents to a generative artificial intelligence (AI) model to generate one or more first labels for the one or more sampled electronic documents, and sending the one or more portions of the one or more second electronic documents to the generative AI model to generate one or more second labels; training, using the at least one processor, a large language model using the one or more first labels and the one or more second labels; and generating, using the at least one processor, a trained large language model.

The method may also include wherein the sampling includes identifying one or more context-based portions of the one or more first electronic documents; assigning one or more identifiers to the one or more context-based portions; and generating the one or more sampled electronic documents using the one or more assigned identifiers, wherein at least one sampled electronic document in the one or more sampled electronic documents corresponds to at least one context-based portion in the one or more context-based portions.

The method may also include wherein the one or more first electronic documents are received from one or more electronic data sources.

The method may also include wherein the one or more electronic data sources include at least one of the following: one or more public databases, one or more non-public databases, one or more government databases, one or more internet database, and any combination thereof.

The method may also include wherein the one or more first electronic documents and the one or more second electronic documents are received from different electronic data sources.

The method may also include wherein the one or more portions of the one or more second electronic documents are identified based on one or more tokens associated with at least one portion in the one or more portions.

The method may also include wherein the one or more tokens are determined based on the content of the one or more portions.

The method may also include wherein the training includes training, based on the or more first labels and the one or more second labels, the large language model using low-rank adaptation.

In one aspect, a system may include at least one processor; and at least one non-transitory storage media storing instructions, that when executed by the at least one processor, cause the at least one processor to retrieve one or more first electronic documents from a plurality of electronic data sources; generate one or more sampled electronic documents based on the one or more first electronic documents; extract one or more portions from the one or more second electronic documents; send the one or more sampled electronic documents to a generative artificial intelligence (AI) model to generate one or more first labels for the one or more sampled electronic documents, and send the one or more portions of the one or more second electronic documents to the generative AI model to generate one or more second labels; train a large language model using the one or more first labels and the one or more second labels; and generate a trained large language model.

The system may also include wherein the at least one processor is configured to identify one or more context-based portions of the one or more first electronic documents; assign one or more identifiers to the one or more context-based portions; and generate the one or more sampled electronic documents using the one or more identifiers, wherein at least one sampled electronic document in the one or more sampled electronic documents corresponds to at least one context-based portion in the one or more context-based portions.

The system may also include wherein the plurality of electronic data sources includes at least one of the following: one or more public databases, one or more non-public databases, one or more government databases, one or more internet database, and any combination thereof.

The system may also include wherein the one or more first electronic documents and the one or more second electronic documents are received from different electronic data sources.

The system may also include wherein the one or more portions of the one or more second electronic documents are identified based on one or more tokens associated with at least one portion in the one or more portions.

The system may also include wherein the one or more tokens are determined based on the content of the one or more portions.

The system may also include wherein the training includes training, based on the or more first labels and the one or more second labels, the large language model using low-rank adaptation.

In one aspect, a computer program product comprising a non-transitory machine-readable medium storing instructions that, when executed by at least one programmable processor, cause the at least one programmable processor to: train a large language model using one or more labels, wherein the one or more labels include at least one of: one or more first labels and one or more second labels, the one or more first labels are generated based on one or more first electronic documents, and the one or more second labels are generated based on one or more portions extracted from one or more second electronic documents; and generate a trained large language model.

The computer program product may also include wherein the one or more labels are generated using a generative artificial intelligence (AI).

The computer program product may also include wherein the at least one processor is configured to identify one or more context-based portions of the one or more first electronic documents; assign one or more identifiers to the one or more context-based portions; and generate the one or more first electronic documents using the one or more identifiers, wherein at least one sampled electronic document in the one or more sampled electronic documents corresponds to at least one context-based portion in the one or more context-based portions.

The computer program product may also include wherein the one or more first electronic documents are retrieved from a plurality of electronic data sources, wherein the plurality of electronic data sources includes at least one of the following: one or more public databases, one or more non-public databases, one or more government databases, one or more internet database, and any combination thereof.

The computer program product may also include wherein the one or more first electronic documents and the one or more second electronic documents are received from different electronic data sources.

Any of the computing apparatus examples given above may also be implemented as means plus function examples. Other technical features may be readily apparent to one skilled in the art from the following figures, descriptions, and claims.

It is emphasized that the Abstract of the Disclosure is provided to allow a reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separate embodiment. In the appended claims, the terms "including" and "in which" are used as the plain-English equivalents of the respective terms "comprising" and "wherein," respectively. Moreover, the terms "first," "second," "third," and so forth, are used merely as labels, and are not intended to impose numerical requirements on their objects.

The foregoing description of example embodiments has been presented for the purposes of illustration and description. It is not intended to be exhaustive or to limit the present disclosure to the precise forms disclosed. Many modifications and variations are possible in light of this disclosure. It is intended that the scope of the present disclosure be limited not by this detailed description, but rather by the claims appended hereto. Future filed applications claiming priority to this application may claim the disclosed subject matter in a different manner and may generally include any set of one or more limitations as variously disclosed or otherwise demonstrated herein.

What is claimed is:

1. A computer-implemented method, comprising:

sampling, using at least one processor, one or more first electronic documents to generate one or more sampled electronic documents, the one or more first electronic documents are stored in a first storage location using a first storage arrangement, wherein sampling includes searching the one or more first electronic documents using one or more context-specific portions and identifying the one or more context-specific portions in the one or more first electronic documents; and selecting, using the identified one or more context-specific portions, the one or more sampled electronic documents containing the one or more context-specific portions:

selecting, using the at least one processor, one or more portions in one or more second electronic documents contextually related to the identified one or more context-specific portions in the one or more first electronic documents, and extracting the one or more portions from the one or more second electronic documents, wherein the one or more second electronic documents are stored in a second storage location using a second storage arrangement being different from the first storage arrangement;

sending, using the at least one processor, the one or more sampled electronic documents and the one or more context-specific portions to a generative artificial intelligence (AI) model to generate one or more first labels for the one or more sampled electronic documents, and sending the one or more portions of the one or more second electronic documents to the generative AI model to generate one or more second labels;

training, using the at least one processor, a large language model using the one or more first labels and the one or more second labels; and generating, using the at least one processor, a trained large language model.

2. The method of claim 1, wherein the sampling includes identifying one or more context-based portions of the one or more first electronic documents;

assigning one or more identifiers to the one or more context-based portions; and generating the one or more sampled electronic documents using the one or more assigned identifiers, wherein at least one sampled electronic document in the one or more sampled electronic documents corresponds to at least one context-based portion in the one or more context-based portions.

3. The method of claim 1, wherein the one or more first electronic documents are received from one or more electronic data sources.

4. The method of claim 3, wherein the one or more electronic data sources include at least one of the following: one or more public databases, one or more non-public databases, one or more government databases, one or more internet database, and any combination thereof.

5. The method of claim 1, wherein the one or more first electronic documents and the one or more second electronic documents are received from different electronic data sources.

6. The method of claim 1, wherein the one or more portions of the one or more second electronic documents are identified based on one or more tokens associated with at least one portion in the one or more portions.

7. The method of claim 6, wherein the one or more tokens are determined based on a content of the one or more portions.

8. The method of claim 1, wherein the training includes training, based on the or more first labels and the one or more second labels, the large language model using low-rank adaptation.

9. A system, comprising:

at least one processor; and at least one non-transitory storage media storing instructions, that when executed by the at least one processor, cause the at least one processor to retrieve one or more first electronic documents from a plurality of electronic data sources;

generate one or more sampled electronic documents based on the one or more first electronic documents, the one or more first electronic documents are stored in a first storage location using a first storage arrangement, wherein generating one or more sampled documents includes searching the one or more first electronic documents using one or more context-specific portions and identifying one or more context-specific portions in the one or more first electronic documents; and selecting, using the identified one or more context-specific portions, the one or more sampled electronic documents containing the one or more context-specific portions:

select and extract one or more portions from one or more second electronic documents contextually related to the identified one or more context-specific portions in the one or more first electronic documents, wherein the one or more second electronic documents are stored in a second storage location using a second storage arrangement being different from the first storage arrangement;

send the one or more sampled electronic documents and the one or more context-specific portions to a generative artificial intelligence (AI) model to generate one or more first labels for the one or more sampled electronic documents, and send the one or more portions of the one or more second electronic documents to the generative AI model to generate one or more second labels;

train a large language model using the one or more first labels and the one or more second labels; and generate a trained large language model.

10. The system of claim 9, wherein the at least one processor is configured to identify one or more context-based portions of the one or more first electronic documents;

assign one or more identifiers to the one or more context-based portions; and generate the one or more sampled electronic documents using the one or more identifiers, wherein at least one sampled electronic document in the one or more sampled electronic documents corresponds to at least one context-based portion in the one or more context-based portions.

11. The system of claim 9, wherein the plurality of electronic data sources includes at least one of the following: one or more public databases, one or more non-public databases, one or more government databases, one or more internet database, and any combination thereof.

12. The system of claim 9, wherein the one or more first electronic documents and the one or more second electronic documents are received from different electronic data sources.

13. The system of claim 9, wherein the one or more portions of the one or more second electronic documents are identified based on one or more tokens associated with at least one portion in the one or more portions.

14. The system of claim 13, wherein the one or more tokens are determined based on content of the one or more portions.

15. The system of claim 9, wherein the training includes training, based on the or more first labels and the one or more second labels, the large language model using low-rank adaptation.

16. A computer program product comprising a non-transitory machine-readable medium storing instructions that, when executed by at least one programmable processor, cause the at least one programmable processor to:

train a large language model using one or more labels, wherein the one or more labels include at least one of: one or more first labels and one or more second labels, the one or more first labels are generated based on one or more first electronic documents, the one or more first electronic documents are stored in a first storage location using a first storage arrangement, wherein the one or more first labels are generated using one or more sampled electronic documents, wherein generation of the one or more sampled electronic documents includes searching the one or more first electronic documents using one or more context-specific portions and identifying one or more context-specific portions in the one or more first electronic documents; and selecting, using the identified one or more context-specific portions, the one or more sampled electronic documents containing the one or more context-specific portions;

and the one or more second labels are generated based on one or more portions selected and extracted from one or more second electronic documents and contextually related to the identified one or more context-based portions in the one or more first electronic documents, wherein the one or more second electronic documents are stored in a second storage location using a second storage arrangement being different from the first storage arrangement; and generate a trained large language model.

17. The computer program product of claim 16, wherein the one or more labels are generated using a generative artificial intelligence (AI).

18. The computer program product of claim 17, wherein the at least one processor is configured to identify the one or more context-based portions of the one or more first electronic documents;

assign one or more identifiers to the one or more context-based portions; and generate the one or more sampled electronic documents using the one or more identifiers, wherein at least one sampled electronic document in the one or more sampled electronic documents corresponds to at least one context-based portion in the one or more context-based portions.

19. The computer program product of claim 17, wherein the one or more first electronic documents are retrieved from a plurality of electronic data sources, wherein the plurality of electronic data sources includes at least one of the following: one or more public databases, one or more non-public databases, one or more government databases, one or more internet database, and any combination thereof.

20. The computer program product of claim 19, wherein the one or more first electronic documents and the one or more second electronic documents are received from different electronic data sources.

* * * * *